(12) United States Patent
Ogasawara et al.

(10) Patent No.: US 8,355,049 B2
(45) Date of Patent: Jan. 15, 2013

(54) SOLID-STATE IMAGING DEVICE INCLUDING AN OPTICAL COMMUNICATION SECTION PLACED IN PROXIMITY TO AN OPTICAL BLACK AREA AND SIGNAL PROCESSING SYSTEM

(75) Inventors: Hidehiko Ogasawara, Chiba (JP); Toshiyuki Sekiya, Tokyo (JP)

(73) Assignee: Sony Corporation, Tokyo (JP)

( * ) Notice: Subject to any disclaimer, the term of this patent is extended or adjusted under 35 U.S.C. 154(b) by 532 days.

(21) Appl. No.: 12/554,506

(22) Filed: Sep. 4, 2009

(65) Prior Publication Data

US 2010/0091144 A1  Apr. 15, 2010

(30) Foreign Application Priority Data

Oct. 10, 2008  (JP) ................. 2008-264583

(51) Int. Cl.
  *H04N 5/225* (2006.01)
  *H04N 9/64* (2006.01)
(52) U.S. Cl. .................... 348/207.1; 348/244
(58) Field of Classification Search ............ 348/207.99, 348/207.1, 211.1, 241, 243, 244
  See application file for complete search history.

(56) References Cited

U.S. PATENT DOCUMENTS

| 6,525,769 | B1 * | 2/2003 | Thomas et al. | 348/243 |
| 6,744,526 | B2 * | 6/2004 | McDermott et al. | 358/1.11 |
| 2002/0070739 | A1 * | 6/2002 | Dishongh et al. | 324/752 |
| 2004/0140417 | A1 * | 7/2004 | Karin | 250/208.1 |

FOREIGN PATENT DOCUMENTS

| JP | 2004-112422 | 4/2004 |
| JP | 2004-219882 | 8/2004 |
| JP | 2006-191465 | 7/2006 |
| JP | 2006-196972 | 7/2006 |

OTHER PUBLICATIONS

U.S. Appl. No. 12/572,637, filed Oct. 2, 2009, Ogasawara, et al.
U.S. Appl. No. 12/572,452, filed Oct. 2, 2009, Ogasawara, et al.
U.S. Appl. No. 12/555,235, filed Sep. 8, 2009, Ogasawara, et al.
U.S. Appl. No. 12/565,369, filed Sep. 23, 2009, Ogasawara, et al.

\* cited by examiner

*Primary Examiner* — Timothy J Henn
(74) *Attorney, Agent, or Firm* — Oblon, Spivak, McClelland, Maier & Neustadt, L.L.P.

(57) ABSTRACT

A solid-state imaging device includes: a pixel section formed on a substrate and having an effective pixel area that converts incident light into an electric signal, and an optical black area placed around the effective pixel area; an optical communication section placed near a predetermined optical black area of the optical black area, and converts a signal read from the pixel section into an optical signal for output; a dark current level supplying section that generates an estimated dark current level varying with a pixel position from which a signal is read, on the basis of a dark current level acquired from the predetermined optical black area, and outputs the estimated dark current level in synchronization with a signal read timing from the effective pixel area; and a noise compensation section that subtracts the estimated dark current level from a signal read from the effective pixel area.

11 Claims, 29 Drawing Sheets

| OPB1 LEVEL V1 | OPB2 LEVEL V2 | OPB LEVEL GENERATING SECTION TO BE SELECTED AS INITIAL LEVEL | OPB LEVEL GENERATING SECTION TO BE SELECTED AS END LEVEL |
|---|---|---|---|
| v1 | v1 | 1 | 1 |
| v2 | v1 | 1 | 2 |
| v3 | v1 | 1 | 3 |

SOLID-STATE IMAGING DEVICE INCLUDING AN OPTICAL COMMUNICATION SECTION PLACED IN PROXIMITY TO AN OPTICAL BLACK AREA AND SIGNAL PROCESSING SYSTEM

BACKGROUND OF THE INVENTION

1. Field of the Invention

The present invention relates to a solid-state imaging device that converts an optical image into an electric signal, and a signal processing system including the solid-state imaging device. More specifically, the present invention makes it possible to output pixel signals read from a solid-state imaging device, as optical signals by an optical communication section, and also remove a dark current component generated in the effective pixel area of the solid-state imaging device while taking into account variations due to heat generated in the optical communication section placed in proximity to an optical black area, by using a dark current component in the optical black area.

2. Description of the Related Art

With the advances in the speed and density of circuit boards, how to cope with problems such as signal delay and EMI is becoming an urgent task. Much attention is being given to an optical wiring technique that overcomes problems associated with electric wiring, such as signal delay, signal degradation, and electromagnetic interference noise radiated from the wiring, and enables high speed transmission.

There has been proposed a technique using such an optical wiring technique, with which a solid-state imaging device is provided to a lens formed so as to be detachable from the camera main body portion, and a signal outputted from the solid-state imaging device can be transmitted by light to the camera main body portion (see, for example, Japanese Unexamined Patent Application No. 2006-196972).

On the other hand, there has been proposed a technique that controls power supply so that an output section is not driven at timings when no pixel output is necessary, in order to suppress heat generated in a solid-state imaging device (see, for example, Japanese Unexamined Patent Application No. 2004-112422).

SUMMARY OF THE INVENTION

Use of the optical wiring technique enables high-speed signal transmission. However, Japanese Unexamined Patent Application No. 2006-196972 discloses only a configuration in which a light emitting device is mounted onto a substrate on which a solid-state imaging device is mounted, and does not describe about the placement of the light emitting device. Thus, problems associated with heat resulting from the positional relation between the solid-state imaging device and the light emitting device have not been overcome.

In this regard, a solid-state imaging device is provided with a light-shielded area called an optical black area. Noise is removed by removing a dark current component generated in the optical black area.

A dark current component generated in a solid-state imaging device greatly varies in value due to the influence of heat. Thus, in the case of a configuration in which the solid-state imaging device includes a light emitting device that serves as a heat source, there is a possibility that variations occur in dark current component due to the influence of heat, leading to deterioration of image quality due to occurrence of black floating or the like.

In addition, no consideration has been given to the influence of heat generated from the light emitting device on the solid-state imaging device, rather than heat generated by the solid-state imaging device as in the technique described in Japanese Unexamined Patent Application No. 2004-112422.

It is desirable to provide a solid-state imaging device which allows pixel signals read from a pixel section to be transmitted at high speed by optical signals while taking the influence of heat generated in an optical communication section into account, and a signal processing system including the solid-state imaging device.

A solid-state imaging device according to an embodiment of the present invention includes: a pixel section having an effective pixel area on which light is incident and which converts incident light into an electric signal, and an optical black area that is shielded from light and placed around the effective pixel area, the pixel section being formed on a substrate; an optical communication section that is placed near a predetermined optical black area of the optical black area placed around the effective pixel area, and converts a signal read from the pixel section into an optical signal and outputs the optical signal; a dark current level supplying section that acquires a dark current level according to dark current from the optical black area in proximity to which the optical communication section is placed, generates an estimated dark current level that varies with a position of a pixel from which a signal is read, on the basis of the acquired dark current level, and outputs the estimated dark current level in synchronization with a timing of reading a signal from the effective pixel area; and a noise compensation section to which the estimated dark current level is supplied from the dark current level supplying section, and which subtracts the estimated dark current level from a signal read from the effective pixel area.

Also, a solid-state imaging device according to an embodiment of the present invention includes: a pixel section having an effective pixel area on which light is incident and which converts incident light into an electric signal, and an optical black area that is shielded from light and placed around the effective pixel area, the optical black area having a first optical black area and a second optical black area formed respectively on one side and the other side across the effective pixel area; and an optical communication section that is placed near the first optical black area relative to the second optical black area, and converts a signal read from the pixel section into an optical signal and outputs the optical signal.

A signal processing system according to an embodiment of the present invention includes the solid-state imaging device described above. That is, the signal processing system includes: an optical apparatus having a solid-state imaging device that converts incident light into an electric signal, and an optical device that makes light incident on the solid-state imaging device; and a signal processing apparatus to which the optical apparatus is connected. The solid-state imaging device includes a pixel section having an effective pixel area on which light is incident and which converts incident light into an electric signal, and an optical black area that is shielded from light and placed around the effective pixel area, an optical communication section that is placed near a predetermined optical black area of the optical black area placed around the effective pixel area, and converts a signal read from the pixel section into an optical signal and outputs the optical signal, a dark current level supplying section that acquires a dark current level according to dark current from the optical black area in proximity to which the optical communication section is placed, generates an estimated dark current level that varies with a position of a pixel from which a signal is read, on the basis of the acquired dark current level, and outputs the estimated dark current level in synchronization with a timing of reading a signal from the effective pixel area, and a noise compensation section to which the estimated dark current level is supplied from the dark current level supplying section, and subtracts the estimated dark current level from a signal read from the effective pixel area. The signal processing apparatus includes an optical communication section to which an optical signal outputted from the optical communication section of the solid-state imaging device is inputted, a read control section that controls reading of a signal from the pixel section by the solid-state imaging device, and a signal processing section that performs processing on a signal that is read from the pixel section and inputted by optical communication from the solid-state imaging device.

According to an embodiment of the present invention, a first dark current level according to dark current generated in the first optical black area in proximity to which the optical communication section is placed, and a second dark current level according to dark current generated in the second optical black area are acquired.

In the first optical black area in proximity to which the optical communication section is placed, the generated dark current varies due to the influence of heat generated in the optical communication section. Thus, the dark current level acquired from the optical black area in proximity to which the optical communication section is placed varies due to the influence of heat generated in the optical communication section.

The dark current level supplying section generates an estimated dark current level that varies in accordance with the position of a pixel from which a signal is read, on the basis of the first dark current level acquired from the first optical black area, and the second current level acquired from the second optical black area. The estimated dark current level varies in accordance with a difference between the first dark current level and the second dark current level, with the first dark current level serving as the initial level and the second dark current level serving as the end level.

In the effective pixel area, a signal is read from a pixel located close to the optical communication section. The dark current level supplying section changes the estimated dark current level in synchronization with the timing of reading a signal from the effective pixel area.

Thus, the dark current level to be subtracted from a signal becomes one that takes into account the influence of heat based on the positional relation between the pixel from which the signal is read, and the optical communication section. Therefore, even in cases where the dark current level varies within the effective pixel area due to the influence of heat, the optimum dark current level is subtracted from a signal in accordance with the position of a pixel, and the dark current level is removed.

With the solid-state imaging device according to an embodiment of the present invention, the optical communication section serving as a heat source is placed near the optical black area, and by using the dark current level that varies due to the influence of heat generated in the optical communication section, the dark current level to be subtracted from a signal is varied in accordance with the position of a pixel from which the signal is read.

Thus, degradation of imaging quality due to the influence of heat can be suppressed. In addition, the freedom of placement can be enhanced by allowing placement of the optical communication section near the pixel section.

With the signal processing system according to an embodiment of the present invention, by provision of the solid-state imaging device described above, a pixel signal whose degradation due to the influence of heat is suppressed can be sent via high-speed transmission by light to a signal processing apparatus to perform signal processing on image data.

DESCRIPTION OF THE PREFERRED EMBODIMENTS

Hereinbelow, with reference to the drawings, a description will be given of a solid-state imaging device, an optical apparatus including a solid-state imaging device, a signal processing apparatus connected to an optical apparatus, and a signal processing system including an optical apparatus and a signal processing apparatus according to an embodiment of the present invention. The description will be given in the following order of topics.

1. Overview of Present Invention
2. Example of Configuration of Solid-state Imaging Device according to First Embodiment
3. Method of Estimating Dark Current in Effective Pixel Area
4. Example of Operation of Solid-state Imaging Device according to First Embodiment
5. Example of Placement of Optical Communication Section
6. Example of Placement of Light-shielding Section
7. Example of Configuration of Signal Processing System including Solid-state Imaging Device
8. Example of Embodiment of Optical Communication Section according to Mode of Signal Transmission in Signal Processing System
9. Example of Effect of Solid-state Imaging Device having Optical Black Area placed near Optical Communication Section <1. Overview of Present Invention>

Figure 1:
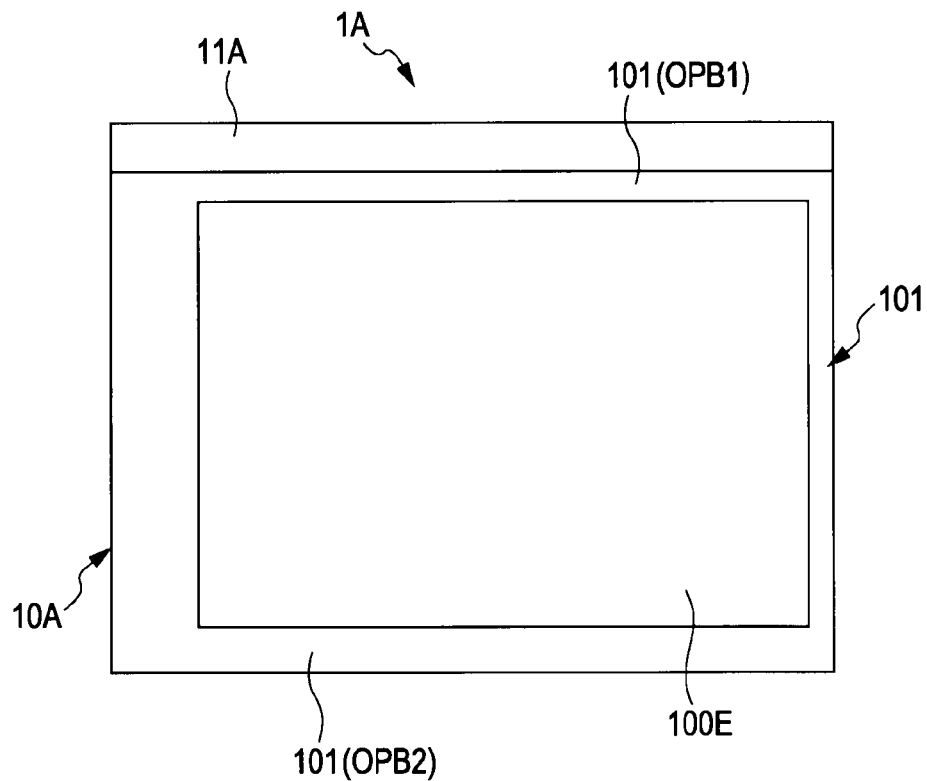
FIG. 1 is a functional block diagram showing an overview of an embodiment of the present invention.
Figure 2:
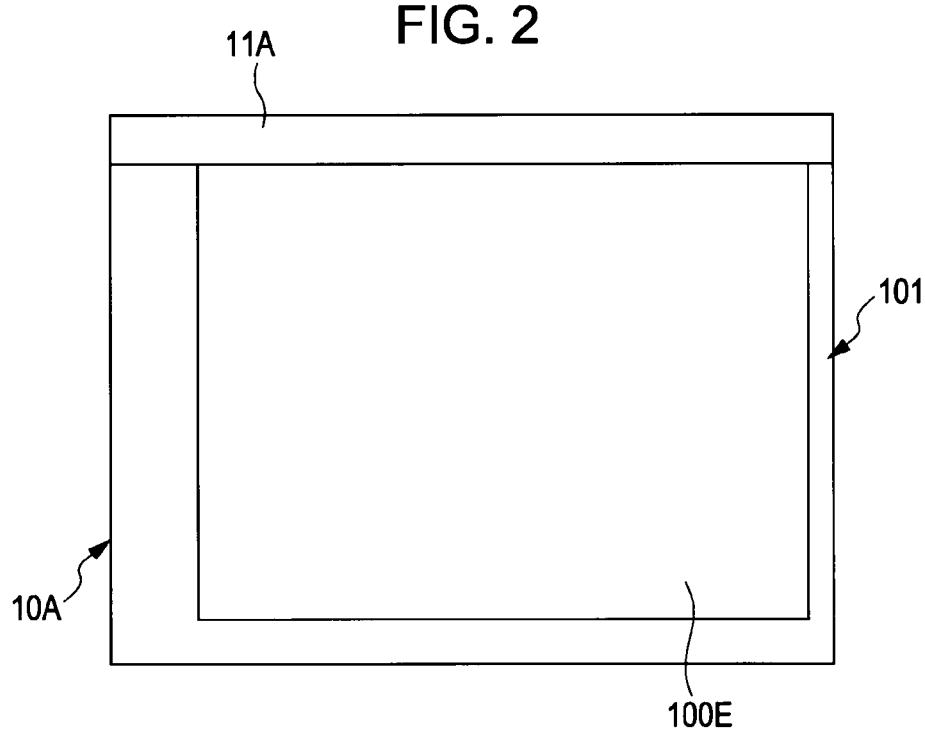
FIG. 2 is a functional block diagram showing a comparative example serving as background for an embodiment of the present invention.

FIG. 1 is a functional block diagram showing an overview of an embodiment of the present invention, and FIG. 2 is a functional block diagram showing a comparative example serving as background for an embodiment of the present invention. Now, a configuration is considered in which, in a solid-state imaging device having a photo-electric conversion function, pixel signals read as electric signals from a pixel section are converted into optical signals and outputted.

In a case where an optical communication section 11A is placed in proximity to a pixel section 10A as shown in FIG. 2, due to heat generated in the optical communication section 11A, an effective pixel area 100E near the optical communication section 11A possesses heat, causing an increase in dark current that is generated even in the absence of incident light. On the other hand, since an optical black area 101 is located opposite to the optical communication section 11A across the effective pixel area 100E, the heat generated in the optical communication section 11A exerts a very small influence on temperature rise, and there is virtually any increase in dark current.

In the case of a solid-state imaging device, dark current generated in the optical black area 101 is used to compensate for dark current generated even when no light is incident on the pixel section 10A. That is, a dark current component acquired from the optical black area 101 is subtracted from signals from the effective pixel area 100E, thereby removing the direct current portion of the dark current.

In the case of a configuration in which the pixel section 10A and the optical communication section 11A are placed in proximity to each other, effective pixels in the vicinity of the optical communication section 11A, and effective pixels located at a position remote from the optical communication section 11A contain different dark current components.

Therefore, if dark current components are removed by using the optical black area 101 in the case of a configuration in which the pixel section 10A and the optical communication section 11A are placed in proximity to each other, there is a possibility of degradation of captured pixels such as black floating.

Accordingly, a configuration as shown in FIG. 1 is proposed. In FIG. 1, a first optical black area 101 (OPB 1) is provided between the optical communication section 11A and the effective pixel area 100E. Due to heat generation in the optical communication section 11A, the effective pixel area 100E near the optical communication section 11A possesses heat, causing an increase in dark current. Likewise, the first optical black area 101 (OPB 1) placed between the optical communication section 11A and the effective pixel area 100E also possesses heat, causing an increase in dark current.

It is assumed that with decreasing proximity to the optical communication section 11A, the influence of heat generation in the optical communication section 11A becomes smaller, and so does the degree of temperature rise in the effective pixel area 100E. Thus, in a second optical black area 101 (OPB 2) located opposite to the optical communication section 11A across the effective pixel area 100E, only a small temperature rise takes place, and there is virtually no increase in dark current.

Accordingly, by using dark current components in the first optical black area 101 (OPB 1) and the second optical black area 101 (OPB 2), the dark current component is estimated for each individual effective pixel, and the dark current component to be subtracted is varied for each pixel. This makes it possible to suppress degradation of imaging quality, and place the optical communication section 11A near the pixel section 10A, thereby enhancing the freedom of placement.

<2. Example of Configuration of Solid-state Imaging Device According to First Embodiment>
[Overall Configuration of Solid-state Imaging Device]

Figure 3:
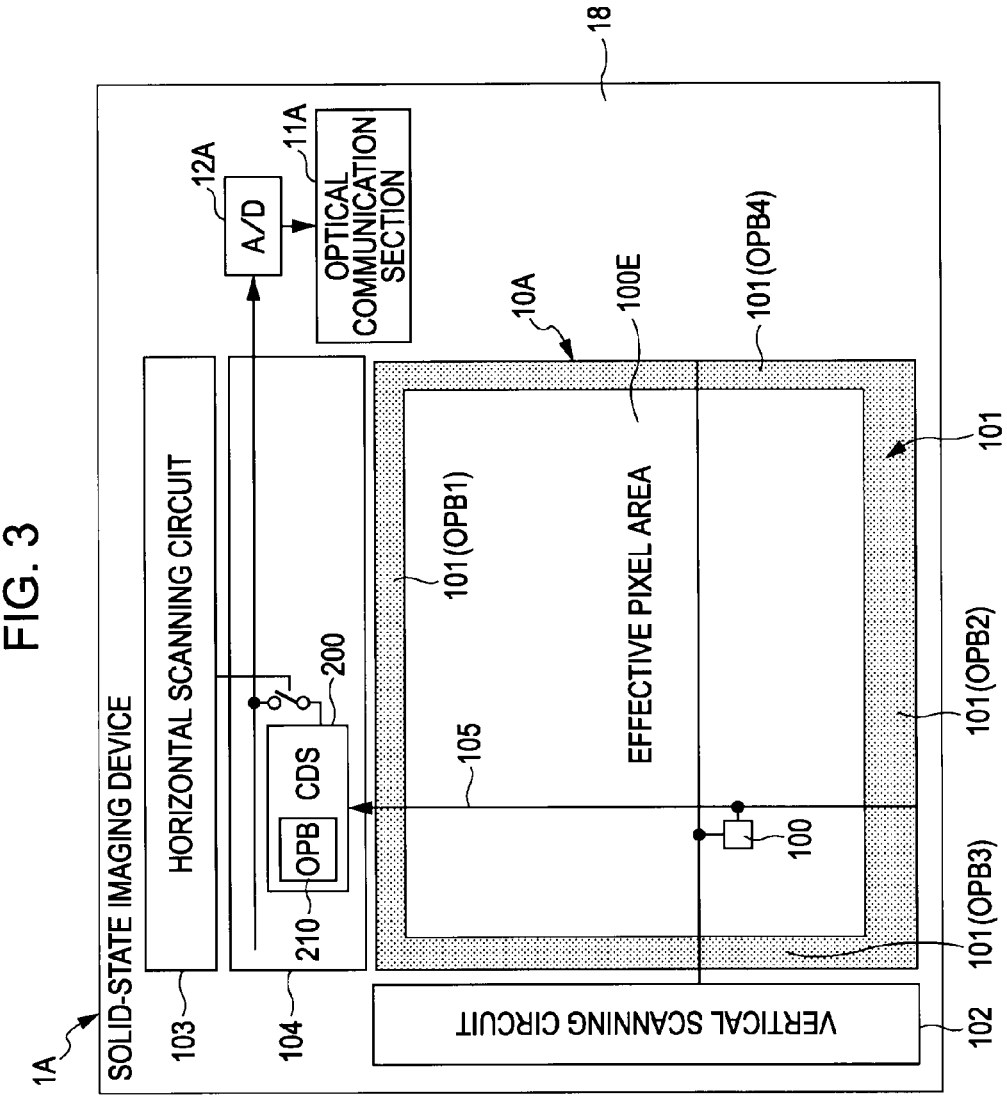
FIG. 3 is a configuration diagram showing an example of a solid-state imaging device according to a first embodiment.
Figure 4:
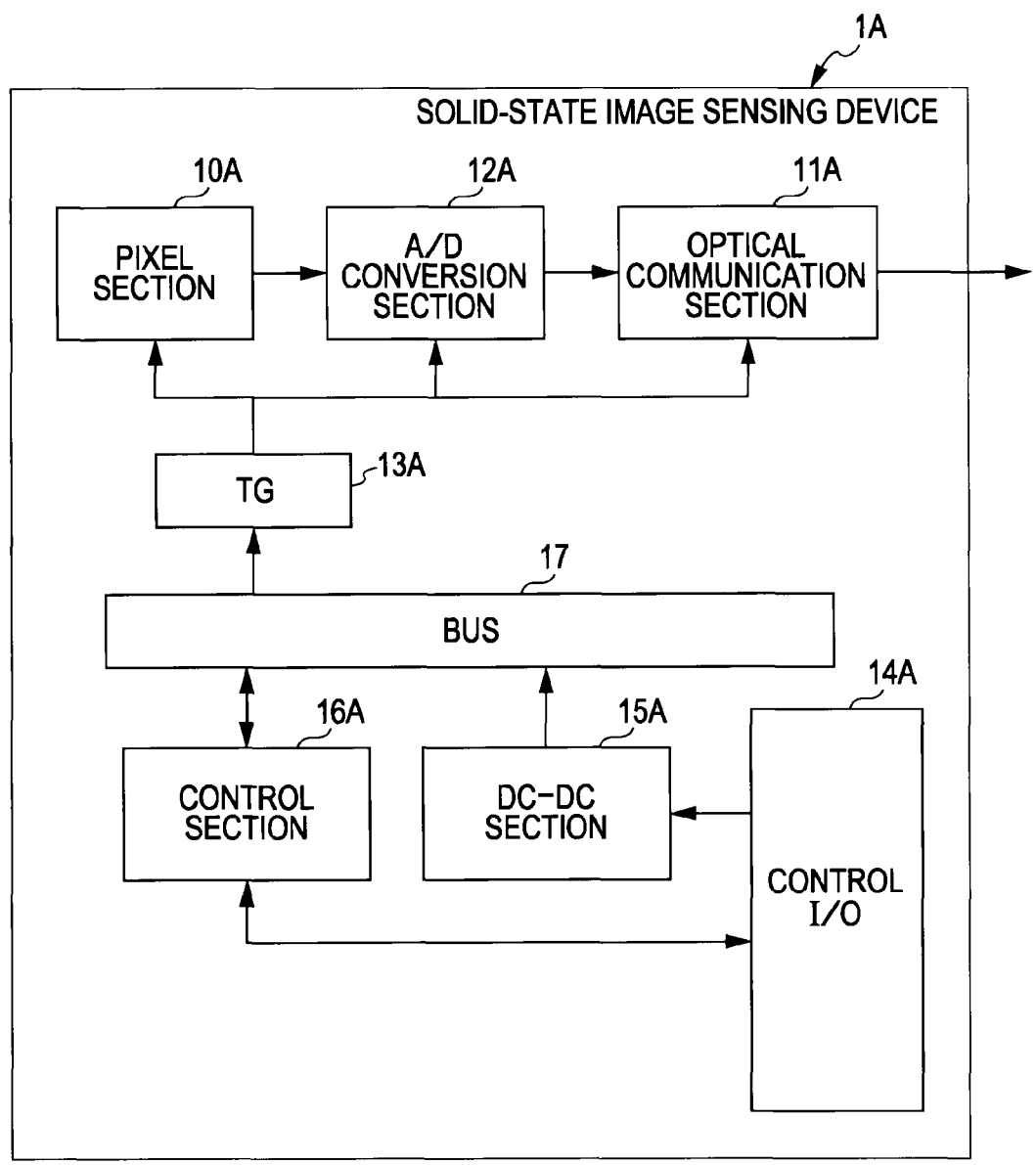
FIG. 4 is a functional block diagram showing an example of functions realizing the solid-state imaging device according to the first embodiment.
Figure 5:
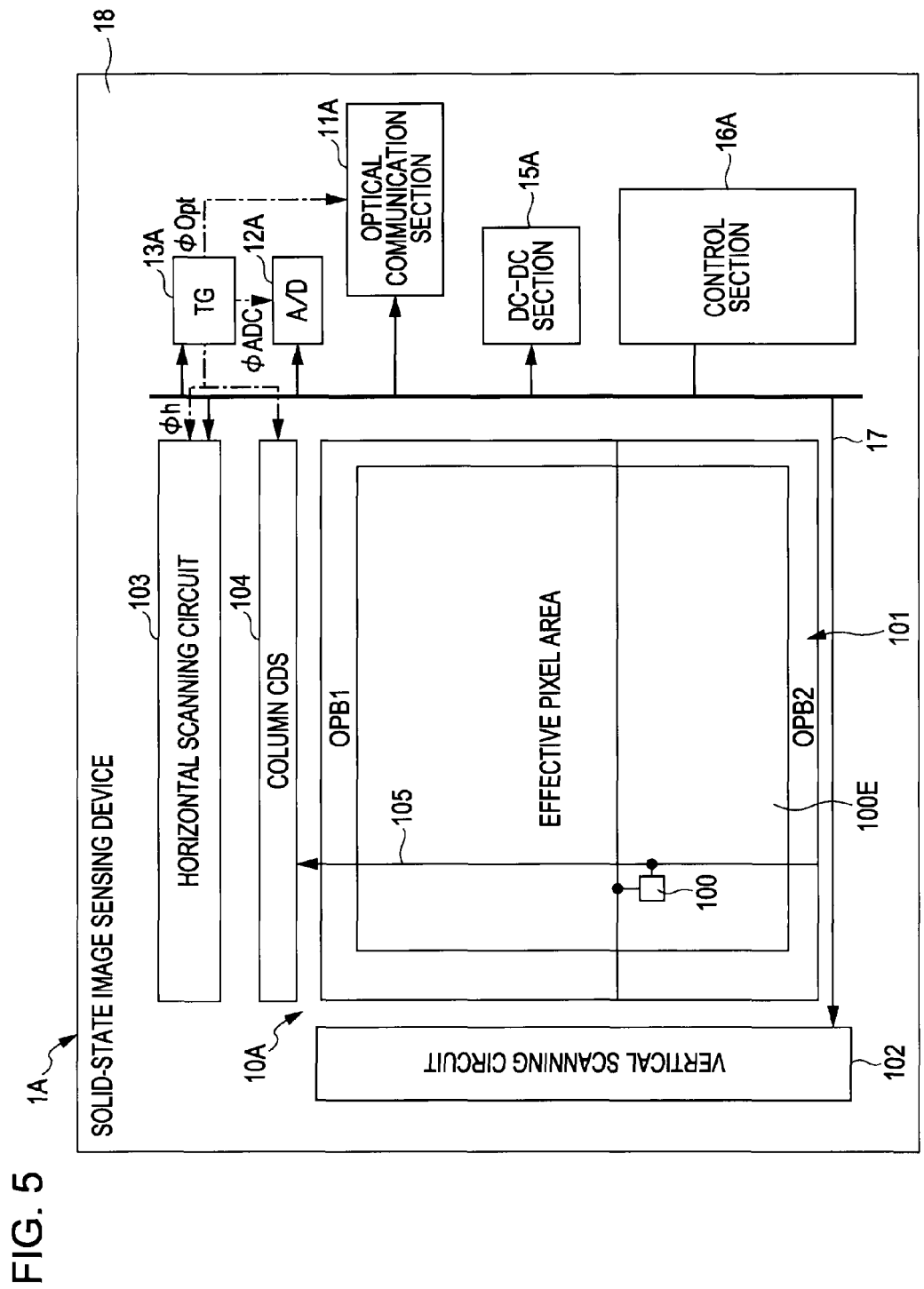
FIG. 5 is a functional block diagram showing an example of functions realizing the solid-state imaging device according to the first embodiment.

FIG. 3 is a configuration diagram showing an example of a solid-state imaging device according to a first embodiment, and FIGS. 4 and 5 are each a functional block diagram showing an example of functions realizing the solid-state imaging device according to the first embodiment.

A solid-state imaging device 1A according to the first embodiment is formed by a CMOS (Complementary Metal Oxide Semiconductor) image sensor, or a CCD (Charge Coupled Device) image sensor. In this example, the description will be directed to the case of a CMOS image sensor.

The solid-state imaging device 1A includes the pixel section 10A that converts light into an electric signal and outputs the electric signal. In the pixel section 10A, pixels 100 for converting light into electricity are arrayed two-dimensionally or one-dimensionally. The pixel section 10A includes the effective pixel area 100E, and the optical black area 101 (OPB 1 to OPB 4) formed around the periphery of the effective pixel area 100E. The effective pixel area 100E is an area configured so that light is incident on the pixels 100. When light is incident on the pixel (effective pixel) 100 in the effective pixel area 100E, an electric signal according to the intensity of incident light is outputted.

The optical black area 101 is an area that is shielded from light so that no light is incident on the pixels 100. Although no light is incident on the optical black area 101, dark current is generated in the optical black area 101. In the pixel section 10A, the optical black area is formed along the four sides of a square. The first optical black area 101 (OPB 1) is formed along one side. In addition, the second optical black area 101 (OPB 2) is formed along a side opposing the first optical black area 101 (OPB 1).

Further, a third optical black area 101 (OPB 3) is formed along a side orthogonal to the first optical black area 101 (OPB 1). In addition, a fourth optical black area 101 (OPB 4) is formed along a side opposing the third optical black area 101 (OPB 3).

The solid-state imaging device 1A includes an A/D conversion section 12A that converts an electric signal outputted from the pixel section 10A into a digital signal, and the optical communication section 11A that converts the electric signal digitized by the A/D conversion section 12A into an optical signal and outputs the optical signal.

The optical communication section 11A includes one or a plurality of optical output sections for converting an electric signal into an optical signal. The optical communication section 11A has, as a first embodiment of an optical output section, a self-emission type light-emitting device such as a semiconductor laser (LD) that emits light upon application of a voltage. The light emitting device such as a semiconductor layer allows modulation of light by an electric signal due to changes in applied voltage or the like. Thus, the optical communication section 11A outputs signal light Ls based on pixel data read from the pixel section 10A, by modulating self-emitted light on the basis of an electric signal converted into a digital signal in the A/D conversion section 12A.

In addition, the optical communication section 11A includes, as a second embodiment of an optical output section, an optical modulator for performing external modulation of transmitted or reflected light that is inputted from the outside, on the basis of an electric signal due to changes in voltage or the like. In the optical communication section 11A, predetermined light from the outside is inputted to the optical modulator, and also an electric signal converted into a digital signal in the A/D conversion section 12A is inputted to the optical modulator. Thus, the optical communication section 11A modulates the light inputted from the outside, on the basis of the electric signal inputted from the A/D conversion section 12A, thereby outputting the signal light Ls based on pixel data read from the pixel section 10A.

In the solid-state imaging device 1A, the optical communication section 11A is placed in proximity to the first optical black area 101 (OPB 1). The term "close proximity" as used herein refers to such positional relation that heat generated by drive of the optical communication device 11A is propagated to the pixel section 10A, causing the dark current generated in the first optical black area 101 (OPB 1) to change. On the other hand, the optical communication section 11A is placed with a separation from the second optical black area 101 (OPB 2). The term separation as used herein refers to such positional relation that even when heat generated by drive of the optical communication device 11A is propagated to the pixel section 10A, there is no substantial change in the dark current generated in the second optical black area 101 (OPB 2). Alternatively, the term separation refers to such positional relation that the change in dark current is small in comparison to that in the first optical black area 101 (OPB 1).

The solid-state imaging device 1A includes a vertical scanning circuit 102 and a horizontal scanning circuit 103 for selecting each one of the pixels 100 from which to read a pixel signal in a XY address mode. The vertical scanning circuit (Row Decoder/Driver) 102 selects each one of the pixels 100 from which to read a pixel signal, in the row direction of the pixel section 10A. Alternatively, by generating a row selection pattern for each individual operation mode, each one of the pixels 100 from which to read a pixel signal may be selected on the basis of the generated selection pattern.

The horizontal scanning circuit (Column Decoder/Driver) 103 selects each one of the pixels 100 from which to read a pixel signal, in the column direction of the pixel section 10A. Alternatively, by generating a column selection pattern for each individual operation mode, each one of the pixels 100 from which to read a pixel signal may be selected on the basis of the generated selection pattern. Further, by performing a computation such as addition of pixels in the horizontal direction, the horizontal scanning circuit 103 performs parallel-to-serial conversion of the sequence of signals outputted from the individual pixels 100.

The solid-state imaging device 1A includes a column CDS circuit 104 for removing noise from pixel signals. A CDS (Correlated Double Sampling) circuit refers to a circuit for taking samples of the reference (reset) level and the data level included in signals, and performing subtraction to compute a difference. The column CDS circuit 104 removes variations in amplification or the like for each of the pixels 100 by a CDS section 200 connected to a column signal line 105 for outputting pixel signals from the pixel section 10A. Within the column CDS circuit 104, signals are processed as they are as analog signals.

The solid-state imaging device 1A uses dark current generated in the optical black area 101 in order to compensate for dark current that is generated in a state in which no light is incident on the pixel section 10A. The CDS section 200 removes the direct current portion of dark current by subtracting the dark current component acquired from the optical black area 101 from signals from the effective pixel area 100E.

The solid-state imaging device 1A includes an OPB level supplying section 210 that supplies an OPB level that is a dark current component to the CDS section 200. The OPB level supplying section 210 acquires a dark current component as a voltage value from the first optical black area 101 (OPB 1). In addition, the OPB level supplying section 210 acquires a dark current component as a voltage value from the second optical black area 101 (OPB 2). Then, the OPB level supplying section 210 generates a dark current level for each of the pixels 100, by using the dark current components in the first optical black area 101 (OPB 1) and the second optical black area 101 (OPB 2). The details of the CDS section 200 and the OPB level supplying section 210 will be described later.

Figure 6:
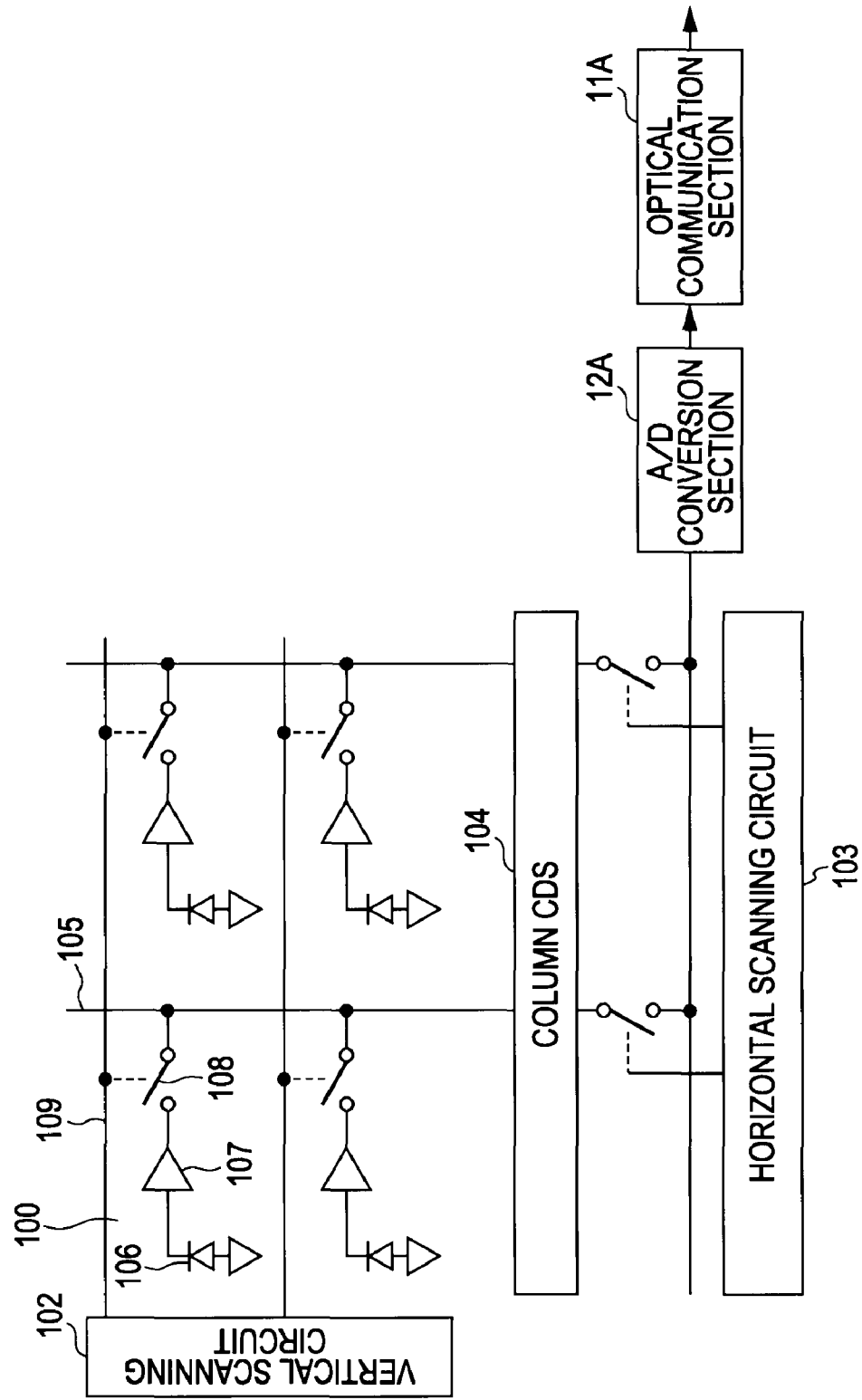
FIG. 6 is a circuit diagram showing a specific example of a pixel array.
Figure 7:
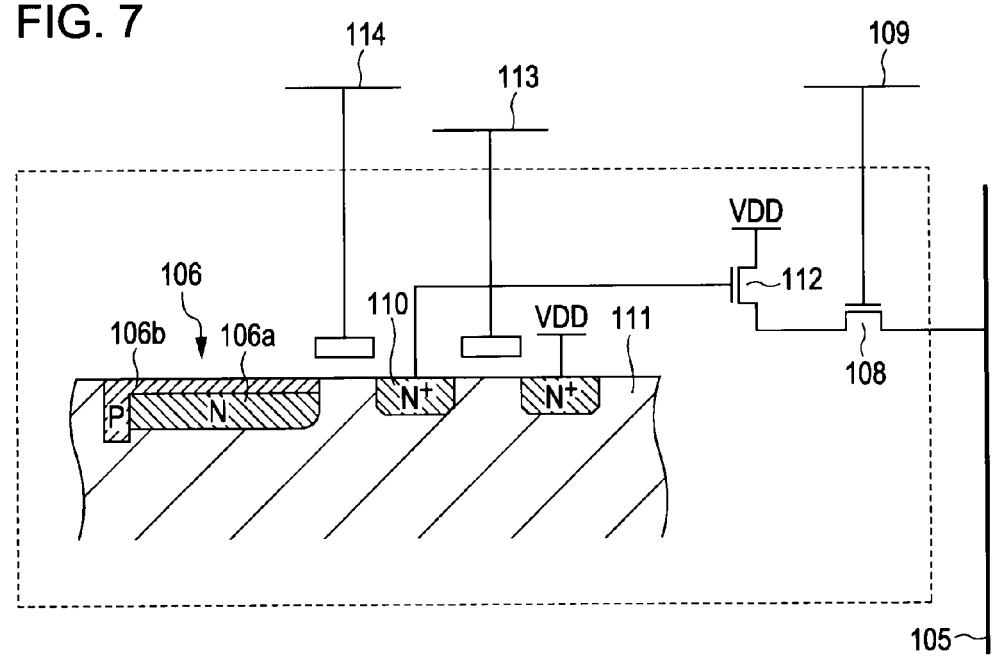
FIG. 7 is a cross-sectional structural view showing an example of the structural model of each pixel.

FIGS. 6 and 7 show the configuration of each pixel and the configuration for reading a pixel signal, respectively. FIG. 6 is a circuit diagram showing a specific example of a pixel array, and FIG. 7 is a cross-sectional structural view showing an example of the structural model of each pixel. The pixels 100 each include a photodiode (PD) 106 that converts light into electricity (signal charge), an FD amplifier 107 that amplifies an electric signal, and a row-selecting transistor (Tr) 108 constituting a row-selecting switch. In each of the pixels 100, the row-selecting transistor 108 is switched ON and OFF via a row selection line 109 by the vertical scanning circuit 102, and an electric signal amplified by the FD amplifier 107 is outputted to the column signal line 105.

The FD amplifier 107 includes a charge detecting section (FD) 110, a reset transistor 111, and an amplification transistor 112, and has a function of amplifying electric charge obtained by photoelectric conversion during a storage period. That is, in the FD amplifier 107, upon completion of a storage period, the charge detecting section 110 is reset via a reset line 113 constituting a reset gate (Rst), prior to outputting a signal. Since the voltage of the charge detecting section 110 that has been reset is connected to the gate of the amplification transistor 112, a reset level indicating a state in which there is no signal is outputted to the column signal line 105 from the source of the amplification transistor 112.

When, immediately after this operation, signal charge is read out from the photodiode 106 to the charge detecting section 110 via a row read line 114 constituting a read gate (Rd), and the row read line 114 is closed after finishing its transfer, the voltage of the charge detecting section 110 changes by an amount corresponding to the intensity of light incident on the photodiode 106. Thus, a data level indicating a state in which there is a signal is outputted to the column signal line 105 from the amplification transistor 112.

The photodiode 106 shown in FIG. 7 is configured as a so-called embedded photodiode in which a P layer area 106$b$ is formed on the surface of an N layer area 106$a$. The P layer area 106$b$ suppresses occurrence of dark current, thereby mitigating FPN (Fixed Pattern Noise) due to dark current.

As described above, in the effective pixel area 100E, a current component obtained by photoelectric conversion is amplified by the FD amplifier 107 and outputted as a voltage value from the column signal line 105. On the other hand, in the optical black area 101, dark current is amplified by the FD amplifier 107, and outputted as a voltage from the column signal line 105.

The dark current level obtained in the optical black area 101 from the column signal line 105 via the FD amplifier 107 is referred to as OPB level. The OPB level indicates the value of a dark current component as amplified by the FD amplifier, and is outputted as a voltage.

Figure 8:
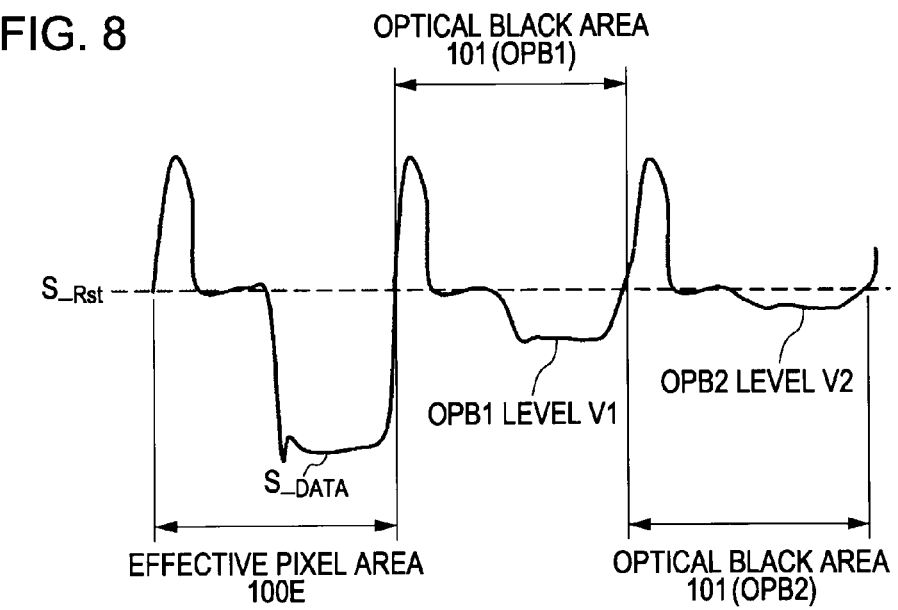
FIG. 8 is a graph showing an example of the waveform of a signal outputted from a pixel section.

FIG. 8 is a graph showing an example of the waveform of a signal outputted from the pixel section. FIG. 8 illustrates a schematic comparison between the date level outputted from the effective pixel area, the dark current level outputted from an optical black area with a large dark current component, the dark current level outputted from an optical black area with a small dark current component, and the reset level. As shown in FIG. 8, the output of the reset level $S_{\_Rst}$ is a large value in comparison to the output of the data level $S_{\_DATA}$ obtained by photoelectric conversion in the effective pixel area 100E. That is, the larger a current value generated in the pixel section 10A, the smaller the voltage value outputted to the column signal line 105. Thus, in the optical black area 101, the larger the dark current component, the smaller the value of the outputted OPB level. As described above, in the first optical black area 101 (OPB 1), the dark current component increases due to the influence of heat generated in the optical communication section 11A. As the dark current component becomes larger, the value of the OPB level outputted from the FD amplifier 107 becomes smaller. Thus, in FIG. 8, the optical black area with a large dark current component is the first optical black area 101 (OPB 1), and the optical black area with a small dark current component is the second optical black area 102 (OPB 2). Then, the relationship between the OPB 1 level V1 outputted from the first optical black area 101 (OPB 1), and the OPB 2 level V2 outputted from the second optical black area 101 (OPB 2) becomes OPB 1 level V1<OPB 2 level V2. As described above, as the dark current component becomes smaller, the value of the OPB level outputted from the FD amplifier 107 becomes larger, and the differential voltage from the reset level $S_{\_Rst}$ becomes smaller. As the dark current component becomes larger, the value of the OPB level becomes smaller, and the differential voltage from the reset level $S_{\_Rst}$ becomes larger. In this example, the differential voltage between an estimated OPB level obtained by using the OPB 1 level V1 and the OPB 2 level V2, and the reset level $S_{\_Rst}$ is subtracted from the data level $S_{\_DATA}$.

The solid-state imaging device 1A includes a timing generator (TG) 13A that generates a drive clock (CLK) corresponding to the operation mode, and supplies the drive clock to each of the functional blocks of the pixel section 10A, the A/D conversion section 12A, and the optical communication section 11A. In addition, the solid-state imaging device 1A includes a control I/O 14A for performing input/output of a control signal or the like, a DC-DC section 15A that supplies power, and a control section 16A that controls reading of pixel data. The control section 16A, the DC-DC section 15A, and the timing generator 13A are connected to a bus 17 to perform transmission/reception of a control signal or data.

The control section 16A controls the DC-DC section 15A to control the supply of power to the solid-state imaging device 1A. In addition, the control section 16A generates a drive clock by the timing generator 13A and supplies the drive clock to each of the pixel section 10A, the A/D conversion section 12A, and the optical communication section 11A, and causes the pixel section 10A, the A/D conversion section 12A, and the optical communication section 11A to operate in synchronization with the drive clock.

As shown in FIG. 3, in the solid-state imaging device 1A, the vertical scanning circuit 102 and the horizontal scanning circuit 103 are connected to the bus 17. A drive clock φh generated by the timing generator 13A is supplied to the horizontal scanning circuit 103 and the column CDS circuit 104. In addition, a drive clock φADC is supplied to the A/D conversion section 12A. Further, a drive clock φOpt is supplied to the optical communication section 11A.

Signal input/output is synchronized among the pixel section 10A, the A/D conversion section 12A, and the optical communication section 11A by the drive clocks supplied from the timing generator 13. In the pixel section 10A, image data corresponding to the image of incident light is read as an electric signal. In the A/D conversion section 12A, the pixel data read from the pixel section 10A is inputted, and converted into a digital signal and outputted. In the optical communication section 11A, the electric signal read from the pixel section 10A and converted into a digital signal by the A/D conversion section 12A is inputted and converted into an optical signal based on pixel data, and the signal light Ls is outputted.

In the solid-state imaging device 1A, the pixel section 10A, the A/D conversion section 12A, the optical communication section 11A, the timing generator 13A, the DC-DC conversion section 15A, and the control section 16A are integrated on a substrate 18 made of silicon (Si). In the solid-state imaging device 1A, these components are integrated into a single chip by using the semiconductor manufacturing process.

[Example of Configuration of CDS Unit]

Figure 9:
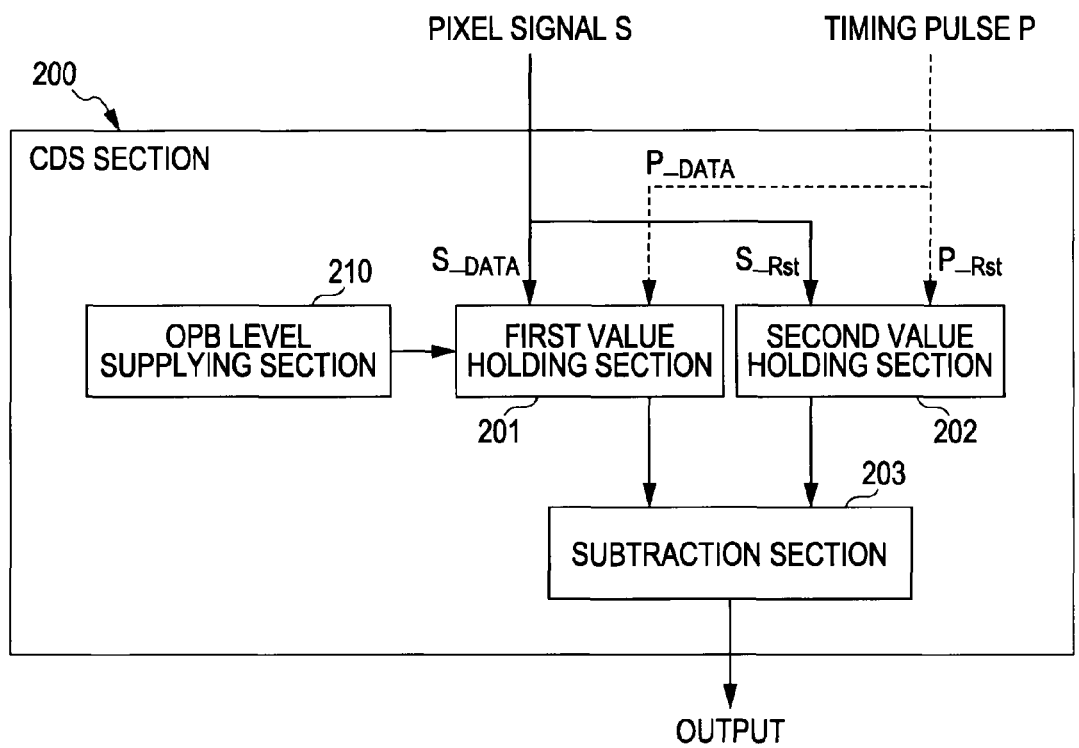
FIG. 9 is a functional block diagram showing an example of a CDS section.

FIG. 9 is a functional block diagram showing an example of a CDS section. The CDS section 200 is an example of a noise compensation section. A pixel signal S read from the pixel section 10A, and a value hold timing pulse P generated by the timing generator 13A are inputted to the CDS section 200.

The CDS section 200 includes a first value holding section 201 that holds the data level $S_{\_DATA}$ read from the pixel section 10A, and a second value holding section 202 that holds the reset level $S_{\_Rst}$ read from the pixel section 10A. In the first value holding section 201, the data level $S_{\_DATA}$ is held at the timing of a data read pulse $P_{\_DATA}$. In the second value holding section 201, the reset level $S_{\_Rst}$ is held at the timing of a reset pulse $P_{\_Rst}$.

The OPB level varied for each of the pixels 100 from which a signal is read is supplied to the first value holding section 201 from the OPB level supplying section 210 at the timing of the data read pulse $P_{\_DATA}$. The first value holding section 201 holds the data level $S_{\_DATA}$ from which is subtracted the OPB level that is varied for each of the positions of the pixels 100 from which a signal is read.

The CDS section 200 includes a subtraction section 203. The subtraction section 203 subtracts the reset level $S_{\_Rst}$ held in the second value holding section 202 from the data level $S_{\_DATA}$ held in the first value holding section 201. As described above, the OPB level is removed from the data level $S_{\_DATA}$ held in the first value holding section 201, and the CDS section 200 computes, as a pixel signal, a difference obtained by removing the OPT level and the reset level $S_{\_Rst}$.

Thus, the CDS section 200 outputs a pixel signal with its noise suppressed by removing the OPB level and the reset level, to the A/D conversion section 12A.

[Example of Configuration of OPB Level Supplying Unit]

Figure 10:
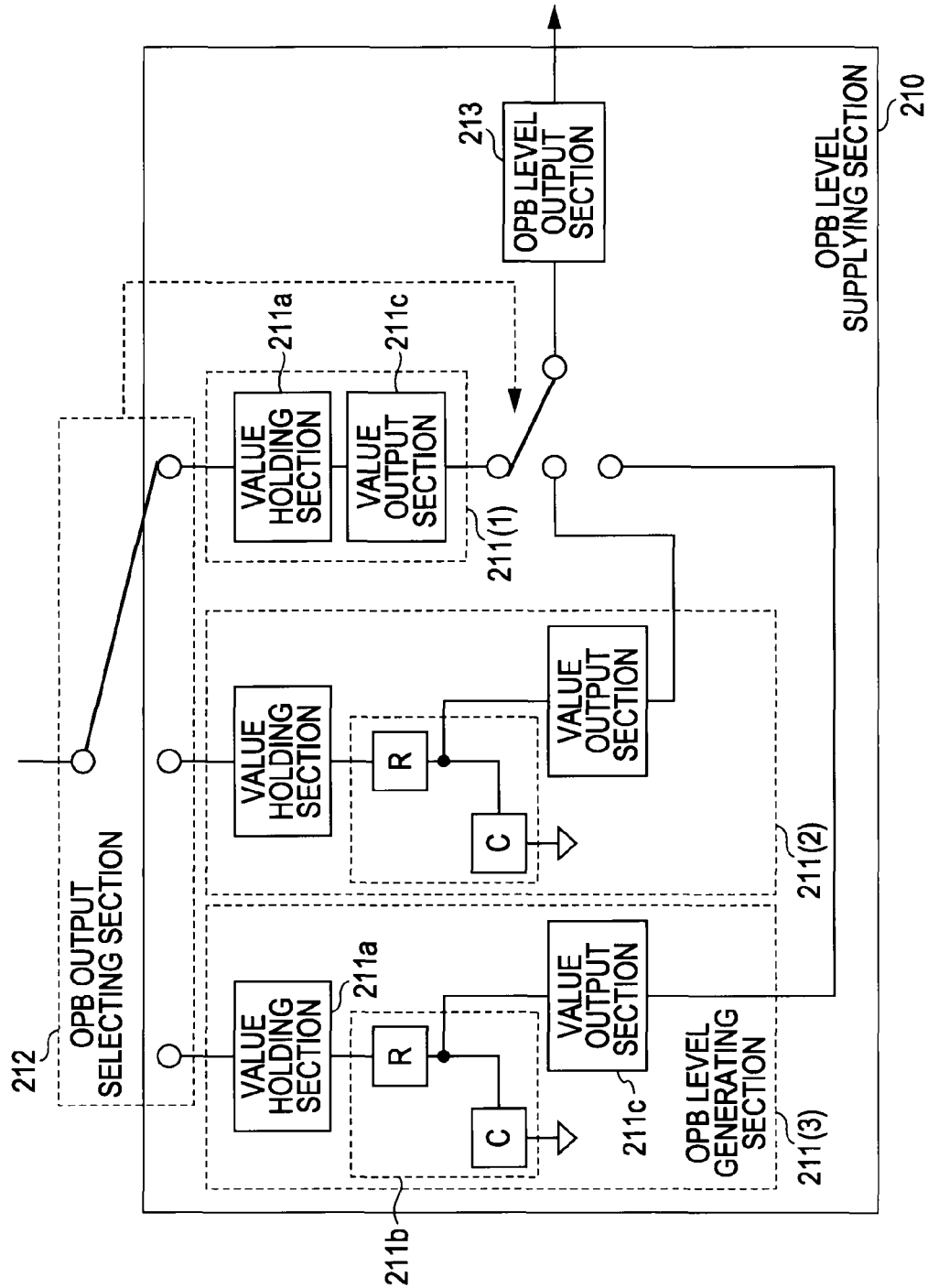
FIG. 10 is a functional block diagram showing an example of an OPB level supplying section.

FIG. 10 is a functional block diagram showing an example of an OPB level supplying section. The OPB level supplying section 210 is an example of dark current level supplying section, and includes an OPB level generating section 211 that generates an estimated OPB level $V_{\_OPB}$ according to the position of a pixel from which a signal is read, on the basis of an OPB level inputted from a predetermined optical black area 101.

In addition, the OPB level supplying section 210 includes an OPB output selecting section 212 that selects the OPB level generating section 211 to/from which an OPB level is inputted/outputted. Further, the OPB level supplying section 210 includes an OPB level output section 213 that outputs the estimated OPB level $V_{\_OPB}$ from the OPB level generating section 211 selected by the OPB output selecting section 212.

Figures 11, 12:
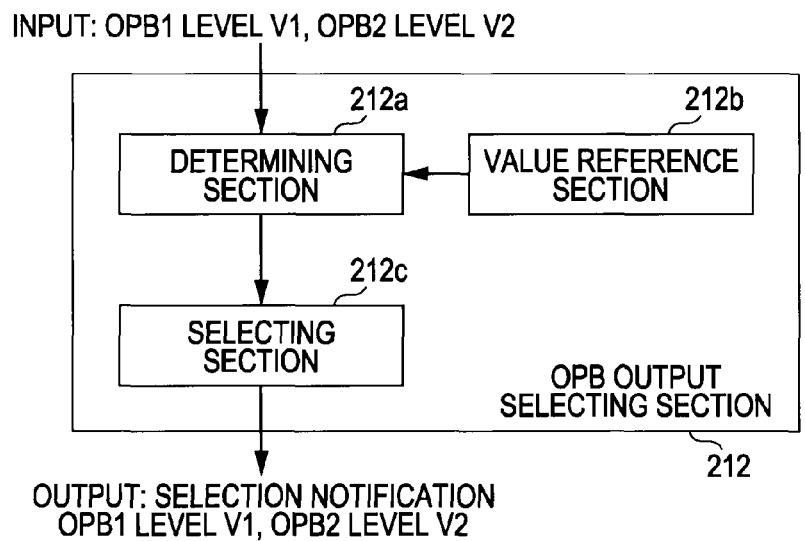
FIG. 11 is a functional block diagram showing an example of an OPB output selecting section.
FIG. 12 is an explanatory diagram showing an example of a value reference section.

FIG. 11 is a functional block diagram showing an example of an OPB output selecting section. The OPB 1 level V1 as a first dark current level acquired from the first optical black area 101 (OPB 1) is inputted to the OPB output selecting section 212. In addition, the OPB 2 level V2 as a second dark current level acquired from the second optical black area 101 (OPB 2) is inputted to the OPB output selecting section 212.

The OPB output selecting section 212 includes a determining section 212a that determines the OPB level generating section 211 to which an OPB level is inputted, on the basis of the inputted OPB level. In addition, the OPB output selecting section 212 includes a value reference section 212b that is a table in which the inputted OPB 1 level V1 and OPB 2 level V2 are associated with the OPB level generating section 211 to be selected. Further, the OPB output selecting section 212 includes a selecting section 212c that selects the OPB level generating section 211 determined by the determining section 212a.

FIG. 12 is an explanatory diagram showing an example of a value reference section. The value reference section 212b stores the OPB 1 level V1 and the OPB 2 level V2, the level generating section number to be selected as an output destination of an initial level, and the level generating section number to be selected as an output destination of an end level.

Figure 13:
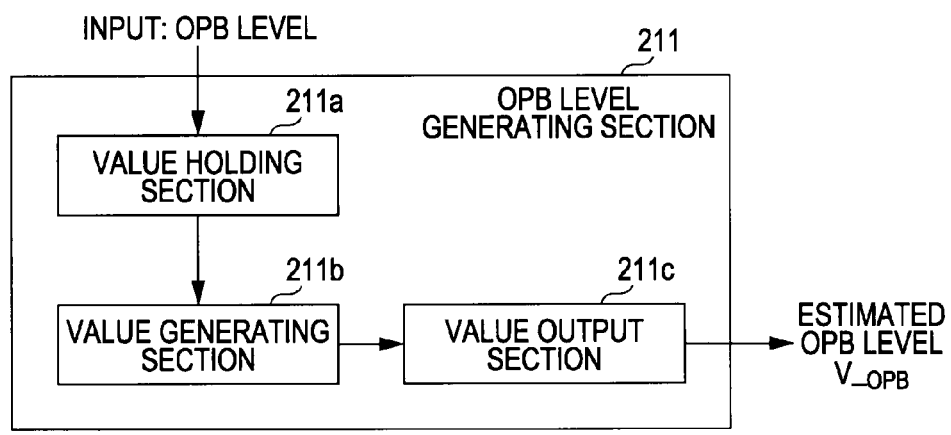
FIG. 13 is a functional block diagram showing an example of an OPB level generating section.

FIG. 13 is a functional block diagram showing an example of an OPB level generating section. The OPB level generating section 211 includes a value holding section 211a that holds an inputted OPB level. The value holding section 211a holds the OPB 1 level V1 inputted from the first optical black area 101 (OPB 1), or the OPB 2 level V2 inputted from the second optical black area 101 (OPB 2).

The OPB level generating section 211 includes a value generating section 211b that generates the estimated level $V_{\_OPB}$ from an OPB level held in the value holding section 211a. As shown in FIG. 10, for example, the value generating section 211b is configured by a low-pass filter having a time constant defined by a resistor R and a capacitor C, and a desired waveform is generated by the value of RC.

The OPB level generating section 211 includes a value output section 211c that outputs the estimated OPB level $V_{\_OPB}$ generated by the value generating section 211b.

The OPB level supplying section 210 includes a first OPB level generating section 211(1) not having the value generating section 211b, and a second OPB level generating section 211(2) having the value generating section 211b with desired characteristics. Alternatively, the OPB level supplying section 210 may include a single or a plurality of OPB level generating sections 211 having value generating sections 211b with difference characteristics. In this example, the OPB level supplying section 210 includes a third OPB level generating section 211(3) having the value generating section 211b with different characteristics from the second OPB level generating section 211(2).

There are cases when the OPB 1 level V1 inputted from the first optical black area 101 (OPB 1) is v1, and the OPB 2 level V2 inputted from the second optical black area 101 (OPB 2) is v1, so the OPB 1 level V1 and the OPB 2 level V2 are equal.

When the OPB 1 level V1 and the OPB 2 level V2 are equal, in accordance with the value reference section 212b shown in FIG. 12, the OPB output selecting section 212 selects the first OPB level generating section 211(1) as the OPB level generating section in which the OPB 1 level V1 and the OPB 2 level V2 are to be held.

Since the OPB 1 level V1 and the OPB 2 level V2 are equal, for example, the OPB output selecting section 212 holds the OPB 1 level V1 in the first OPB level generating section 211(1). Then, the OPB output selecting section 212 fixes the OPB level generating section to which an OPB level is to be outputted, to the first OPB level generating section 211(1).

Thus, the OPB 1 level V1 held in the first OPB level generating section 211(1) becomes the initial level of the estimated OPB level $V_{\_OPB}$, and the estimated OPB level $V_{\_OPB}$ is fixed to the OPB 1 level V1 (=v1).

When the OPB 1 level V1 is v2, and the OPB 2 level V2 is v1 (v2<v1), the OPB output selecting section 212 selects the first OPB level generating section 211(1) as the OPB level generating section in which the OPB 1 level V1 is to be held. In addition, the OPB output selecting section 212 selects the second OPB level generating section 211(2) as the OPB level generating section in which the OPB 2 level V2 is to be held.

The OPB output selecting section 212 holds the OPB 1 level V1 in the first OPB level generating section 211(1). In addition, the OPB output selecting section 212 holds the OPB 2 level V2 in the second OPB level generating section 211(2). Then, the OPB output selecting section 212 switches the OPB level generating section to which an OPB level is to be outputted, from the first OPB level generating section 211(1) to the second OPB level generating section 211(2) in synchronization with the read timing of a signal from the pixel section 10A.

Thus, the OPB 1 level V1 held in the first OPB level generating section 211(1) becomes the initial level of the estimated OPB level $V_{\_OPB}$. In addition, the OPB 2 level V2 held in the second OPB level generating section 211(2) becomes the end level of the estimated OPB level $V_{\_OPB}$. The estimated OPB level $V_{\_OPB}$ varies between the OPB 1 level V1 (=v2), and the OPB 2 level V2 (=v1) depending on the characteristics of the value generating section 211b.

When the OPB 1 level V1 is v3, and the OPB 2 level V2 is v1 (v3<v1), the OPB output selecting section 212 selects the first OPB level generating section 211(1) as the OPB level generating section in which the OPB 1 level V1 is to be held. In addition, the OPB output selecting section 212 selects the third OPB level generating section 211(3) as the OPB level generating section in which the OPB 2 level V2 is to be held.

The OPB output selecting section 212 holds the OPB 1 level V1 in the first OPB level generating section 211(1). In addition, the OPB output selecting section 212 holds the OPB 2 level V2 in the third OPB level generating section 211(3). Then, the OPB output selecting section 212 switches the OPB level generating section to which an OPB level is to be outputted, from the first OPB level generating section 211(1) to the third OPB level generating section 211(3) in synchronization with the read timing of a signal from the pixel section 10A.

Thus, the OPB 1 level V1 held in the first OPB level generating section 211(1) becomes the initial level of the estimated OPB level $V_{\_OPB}$. In addition, the OPB 2 level V2 held in the third OPB level generating section 211(3) becomes the end level of the estimated OPB level $V_{\_OPB}$. The estimated OPB level $V_{\_OPB}$ varies between the OPB 1 level V1 (=v3), and the OPB 2 level V2 (=v1) depending on the characteristics of the value generating section 211b.

Figure 14A:
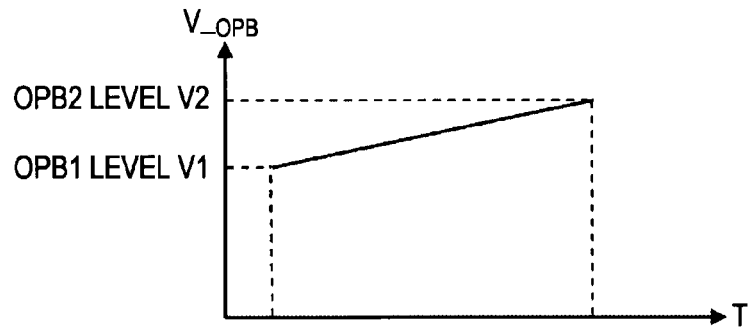
FIGS. 14A and 14B are graphs each showing an example of the waveform of an estimated OPB level.
Figure 14B:
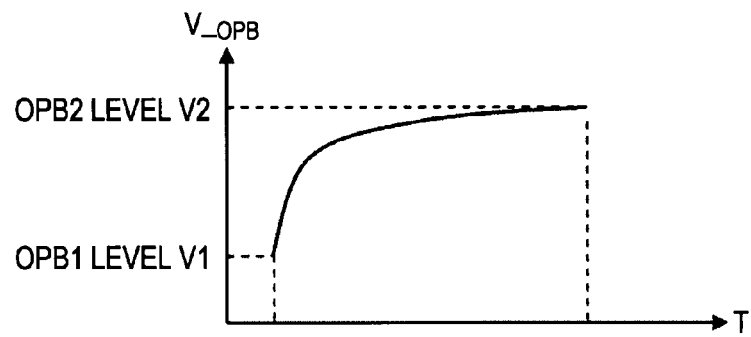

FIGS. 14A and 14B are graphs each showing an example of the waveform of an estimated OPB level. As shown in FIG. 14A, when the difference between the OPB 1 level V1 and the OPB 2 level V2 is small, the estimated OPB level $V_{\_OPB}$ is linearly interpolated between the OPB 1 level V1 and the OPB 2 level V2. On the other hand, as shown in FIG. 14B, when the difference between the OPB 1 level V1 and the OPB 2 level V2 is large, the estimated OPB level $V_{\_OPB}$ is non-linearly interpolated between the OPB 1 level V1 and the OPB 2 level V2. For example, the estimated OPB level $V_{\_OPB}$ is non-linearly interpolated so as to rise sharply near the OPB 1 level V1.

When the difference between the OPB 1 level V1 and the OPB 2 level V2 is small, the OPB level supplying section 210 holds the OPB 1 level V1 in the first OPB level generating section 211(1), and the OPB 2 level V2 in the second OPB level generating section 211(2). The value generating section 211b of the second OPB level generating section 211(2) is configured so that the waveform as shown in FIG. 14A is obtained.

When the difference between the OPB 1 level V1 and the OPB 2 level V2 is large, the OPB level supplying section 210 holds the OPB 1 level V1 in the first OPB level generating section 211(1), and the OPB 2 level V2 in the third OPB level generating section 211(3). The value generating section 211b of the third OPB level generating section 211(3) is configured so that the waveform as shown in FIG. 14B is obtained.

Thus, the OPB level generating section 211 is selected on the basis of the difference between the OPB 1 level V1 and the OPB 2 level V2, and the estimated OPB level $V_{\_OPB}$ is generated on the basis of the difference between the OPB 1 level V1 and the OPB 2 level V2.

<3. Method of Estimating Dark Current in Effective Pixel Area>

Next, a description will be given of the method of estimating dark current in a pixel at an arbitrary position of the effective pixel area, from dark current in the optical black area.

[Linear Interpolation in Vertical Direction]

Figure 15:
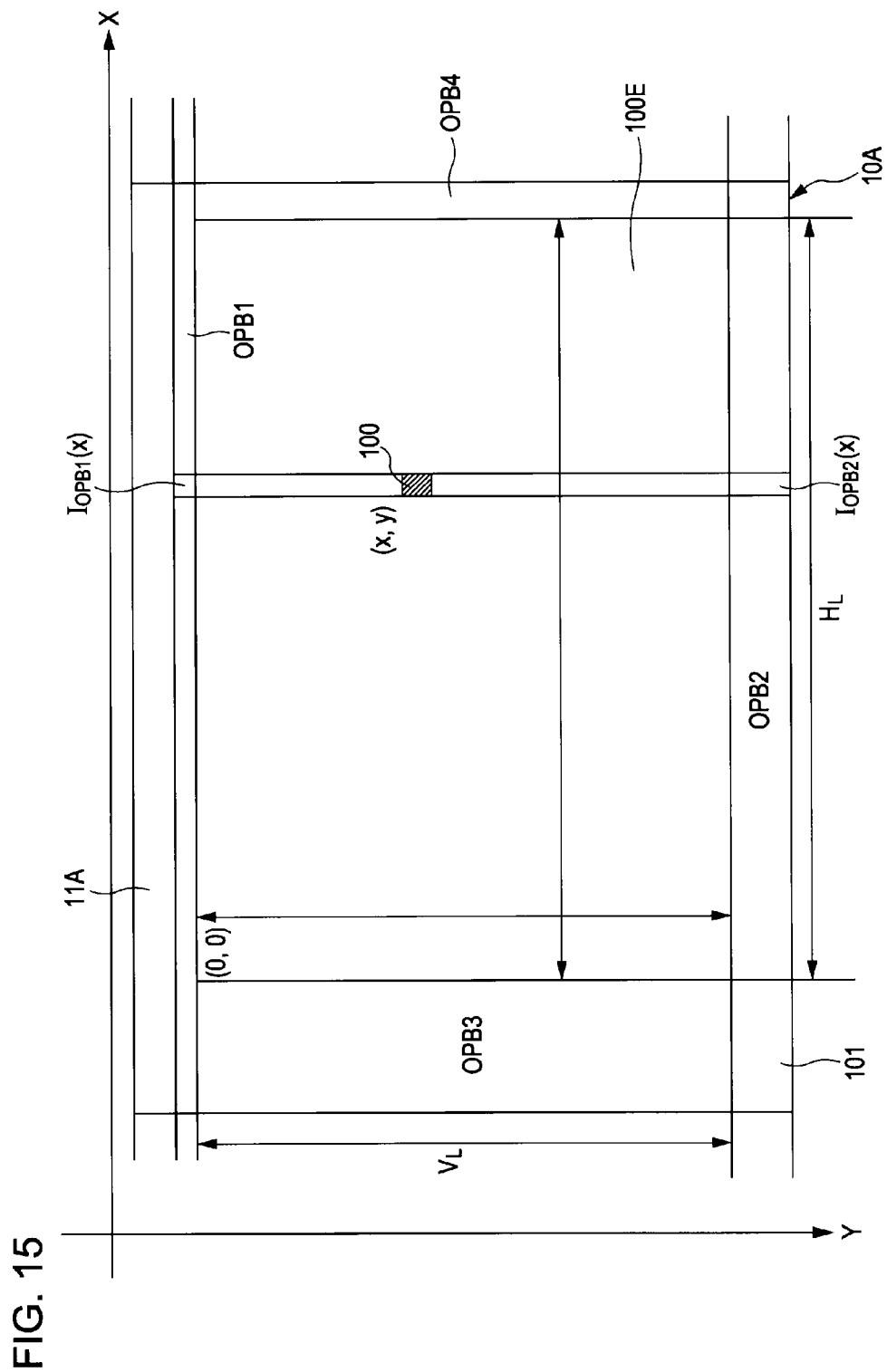
FIG. 15 is an explanatory diagram showing the relationship between a pixel whose dark current is to be estimated in an effective pixel area, and an optical black area in the vertical direction.

FIG. 15 is an explanatory diagram showing the relationship between a pixel whose dark current is to be estimated in the effective pixel area, and the optical black area in the vertical direction. The length in the vertical (V) direction of the effective pixel area 100E is defined as $V_L$. The length in the horizontal (H) direction of the effective pixel area 100E is defined as $H_L$.

The mean dark current at position x in the first optical black area 101 (OPB 1) is defined as $I_{OPB1}(x)$. The mean dark current at position x in the second optical black area 101 (OPB 2) is defined as $I_{OPB2}(x)$.

When the mean dark currents $I_{OPB1}(x)$ and $I_{OPB2}(x)$ are defined as mentioned above, the dark current $I_{DARK}(x,y)$ of the pixel 100 that is present at position (x,y) of the effective pixel area 100E can be estimated from Equation (1) below.

$$I_{dark}(x, y) = \frac{I_{OPB2}(x) - I_{OPB1}(x)}{V_L} \cdot y + I_{OPB1}(x) \quad (1)$$

[Linear Interpolation in Horizontal Direction]

Figure 16:
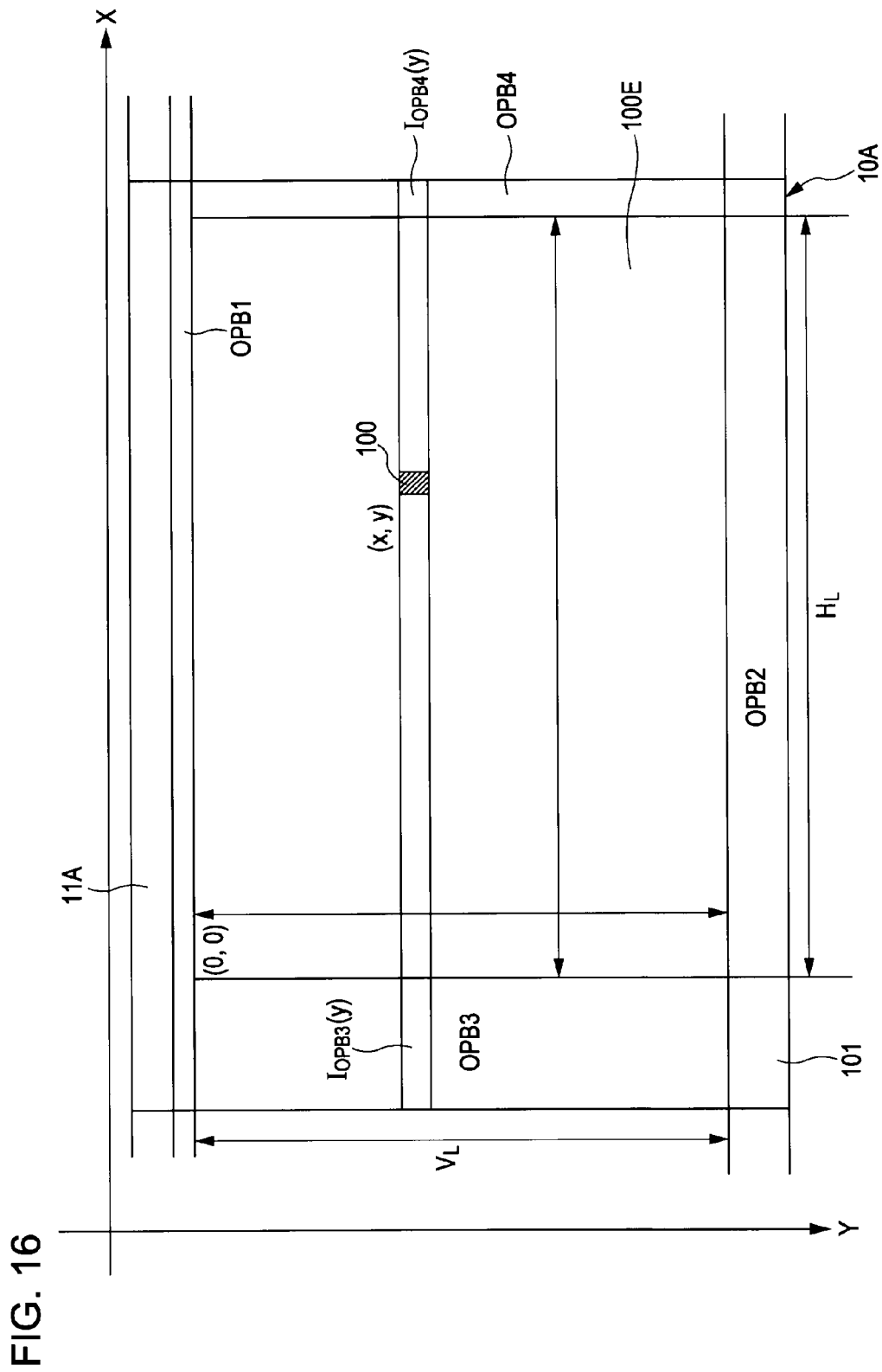
FIG. 16 is an explanatory diagram showing the relationship between a pixel whose dark current is to be estimated in an effective pixel area, and an optical black area in the horizontal direction.

FIG. 16 is an explanatory diagram showing the relationship between a pixel whose dark current is to be estimated in the effective pixel area, and the optical black area in the horizontal direction. The length in the vertical (V) direction of the effective pixel area 100E is defined as $V_L$. The length in the horizontal (H) direction of the effective pixel area 100E is defined as $H_L$.

The mean dark current at position y in the third optical black area 101 (OPB 3) is defined as $I_{OPB3}(y)$. The mean dark current at position y in the fourth optical black area 101 (OPB 4) is defined as $I_{OPB4}(y)$.

When the mean dark currents $I_{OPB3}(y)$ and $I_{OPB4}(y)$ are defined as mentioned above, the dark current $I_{DARK}(x,y)$ of the pixel 100 that is present at position (x,y) of the effective pixel area 100E can be estimated from Equation (2) below.

$$I_{dark}(x, y) = \frac{I_{OPB4}(y) - I_{OPB3}(y)}{H_L} \cdot x + I_{OPB3}(y) \quad (2)$$

[Weighted Sum of Linear Interpolations in Vertical and Horizontal Directions]

Figure 17:
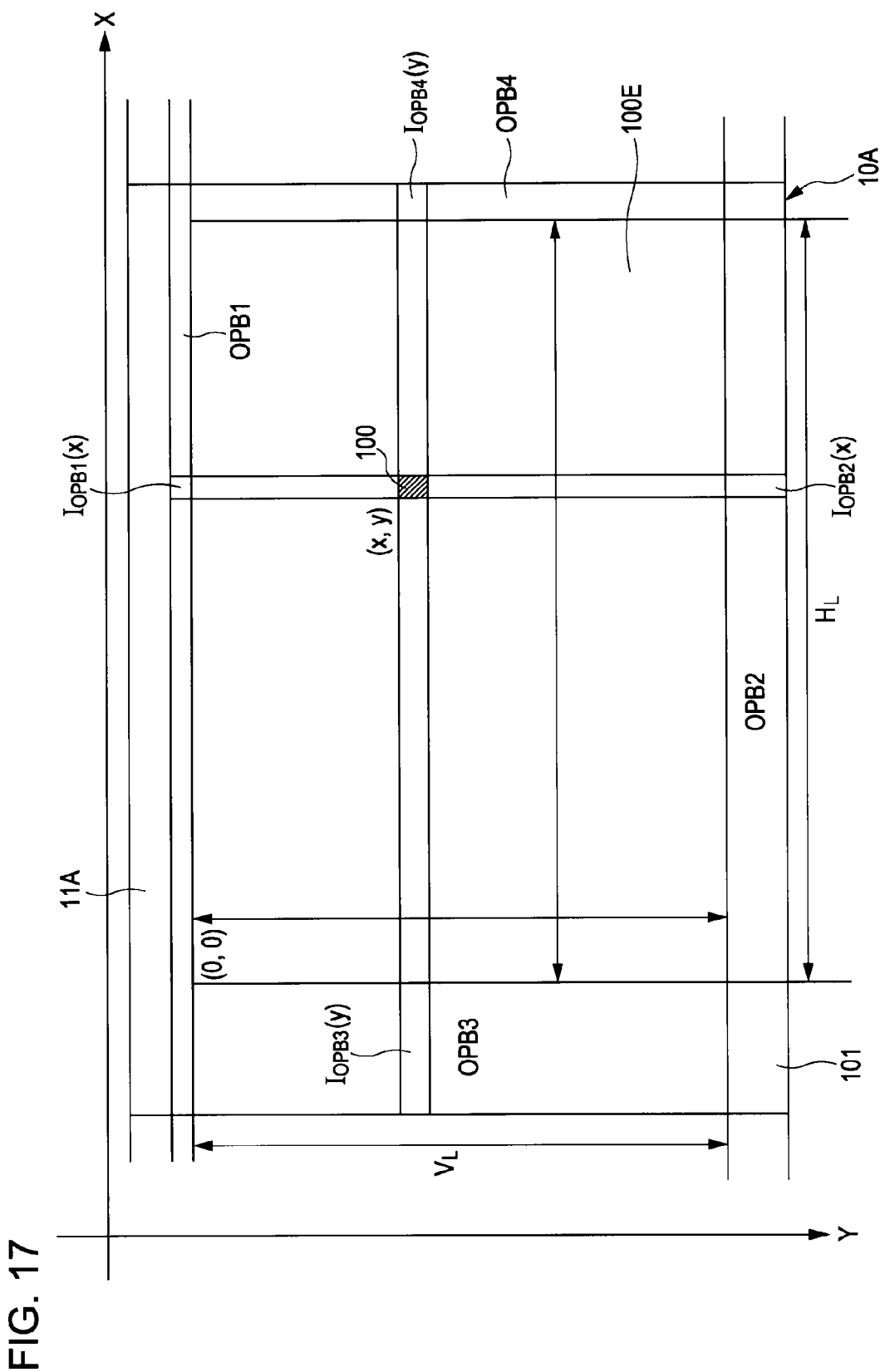
FIG. 17 is an explanatory diagram showing the relationship between a pixel whose dark current is to be estimated in an effective pixel area, and an optical black area in the vertical direction and the horizontal direction.

FIG. 17 is an explanatory diagram showing the relationship between a pixel whose dark current is to be estimated in the effective pixel area, and the optical black area in the vertical direction and the horizontal direction. The length in the vertical (V) direction of the effective pixel area 100E is defined as $V_L$. The length in the horizontal (H) direction of the effective pixel area 100E is defined as $H_L$.

The mean dark current at position x in the first optical black area 101 (OPB 1) is defined as $I_{OPB1}(x)$. The mean dark current at position x in the second optical black area 101 (OPB 2) is defined as $I_{OPB2}(x)$.

The mean dark current at position y in the third optical black area 101 (OPB 3) is defined as $I_{OPB3}(y)$. The mean dark current at position y in the fourth optical black area 101 (OPB 4) is defined as $I_{OPB4}(y)$.

When the mean dark currents $I_{OPB1}(x)$ and $I_{OPB2}(x)$, and $I_{OPB3}(Y)$ and $I_{OPB4}(y)$ are defined as mentioned above, the slope in the vertical direction is obtained by Equation (3). The slope in the horizontal direction is obtained by Equation (4). Further, the dark current $I_{DARK}(x,y)$ of the pixel 100 that is present at position (x,y) of the effective pixel area 100E can be estimated from Equation (5) below.

$$V_{slope} = \frac{I_{OPB2}(x) - I_{OPB1}(x)}{V_L} \quad (3)$$

$$H_{slope} = \frac{I_{OPB4}(y) - I_{OPB3}(y)}{H_L} \quad (4)$$

$$I_{dark}(x, y) = \frac{V_{slope}}{V_{slope} + H_{slope}} \cdot \left( \frac{I_{OPB2}(x) - I_{OPB1}(x)}{V_L} \cdot y + I_{OPB1}(x) \right) + \frac{H_{slope}}{V_{slope} + H_{slope}} \cdot \left( \frac{I_{OPB4}(y) - I_{OPB3}(y)}{H_L} \cdot x + I_{OPB3}(y) \right) \quad (5)$$

In Equation (5), the weights of the interpolated values in the vertical direction and the horizontal direction are determined in accordance with the sizes of the slopes in the vertical direction and the horizontal direction.

<4. Example of Operation of Solid-state Imaging Device according to First Embodiment>

Figure 18:
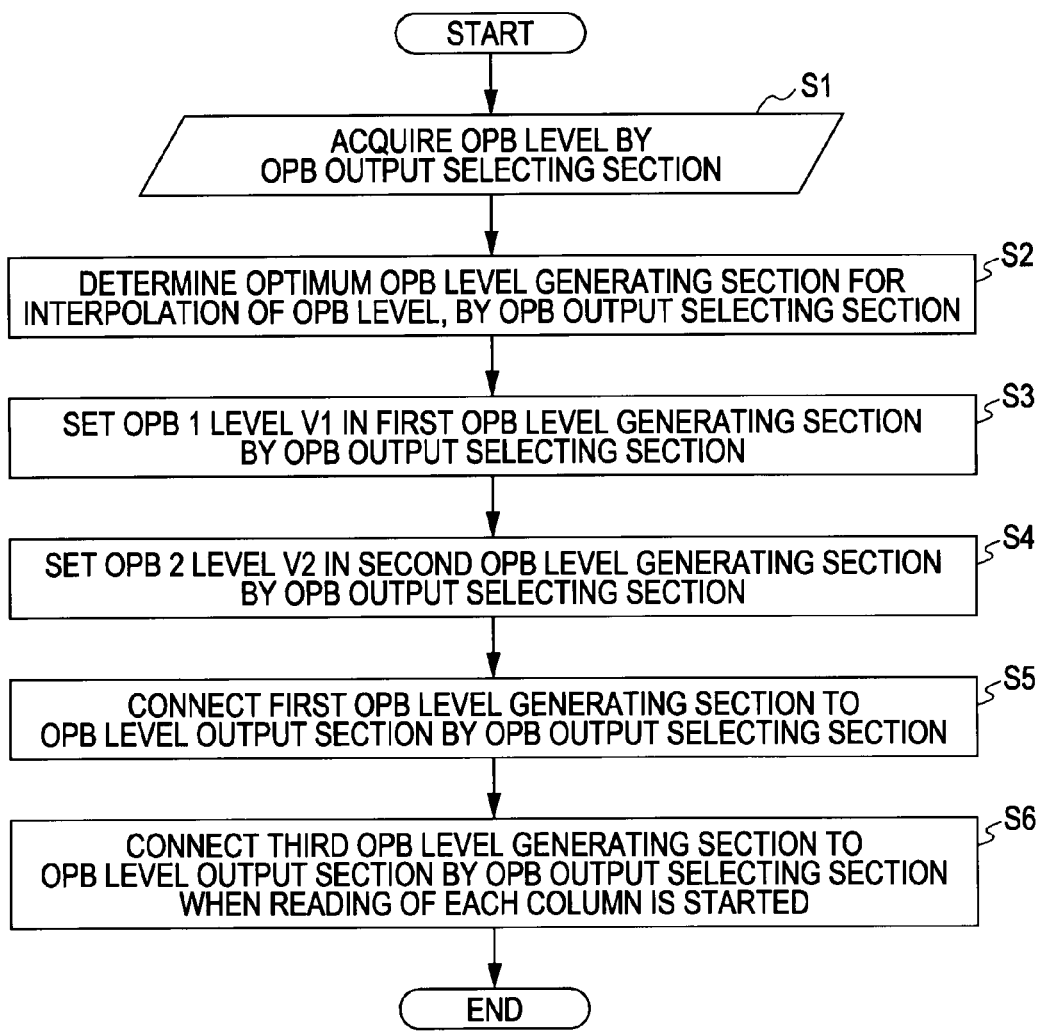
FIG. 18 is a flowchart showing an example of processing of the solid-state imaging device according to the first embodiment.

FIG. 18 is a flowchart showing an example of processing of the solid-state imaging device according to the first embodiment, and FIGS. 19 to 23 are explanatory operation diagrams each showing an example of processing of the solid-state imaging device according to the first embodiment. In the following, a description will be given of the process of generating the estimated OPB level $V_{\_OPB}$ with reference to the drawings.

Figure 19:
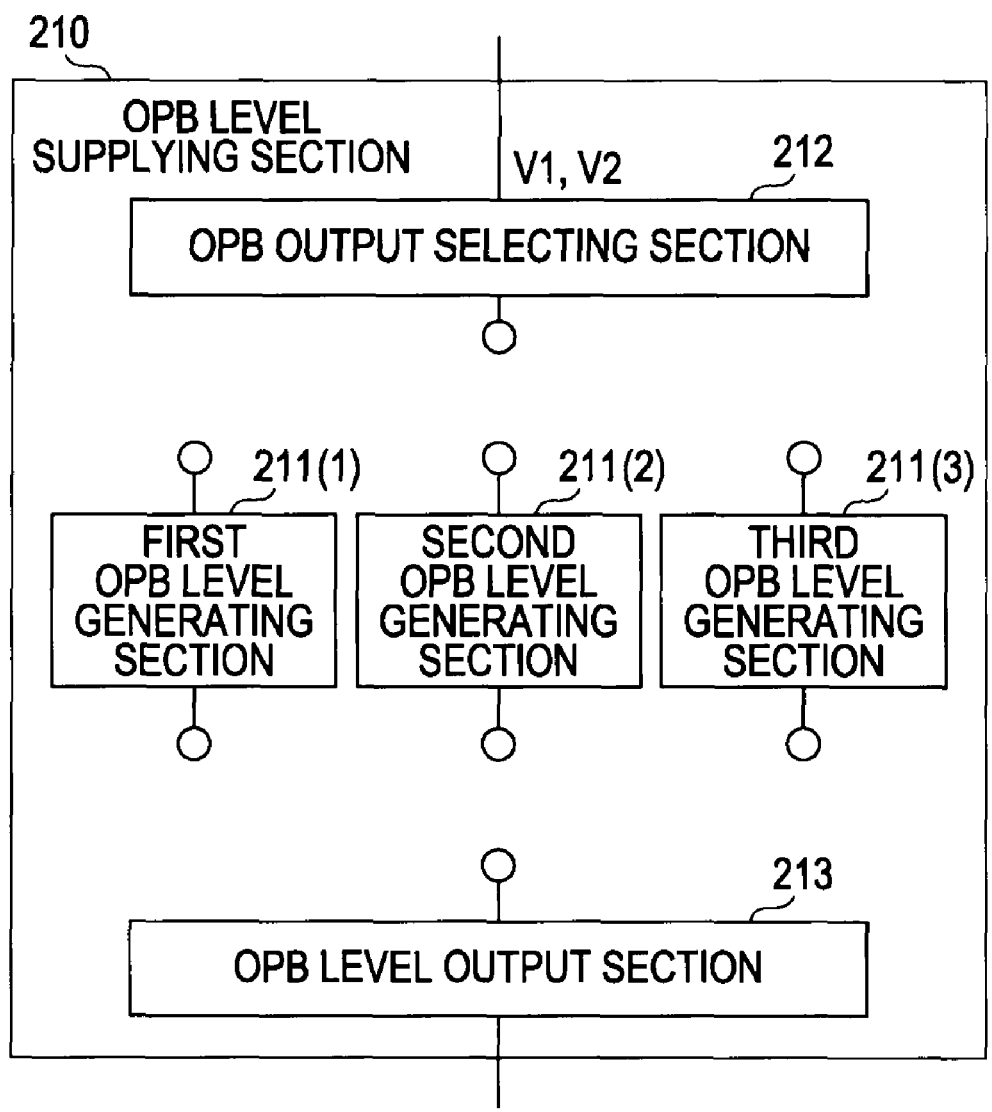
FIG. 19 is an explanatory operation diagram showing an example of processing of the solid-state imaging device according to the first embodiment.

In the process of step S1, the OPB level supplying section 210 acquires an OPB level from the optical black area 101 of the pixel section 10A. In the process of step S1, as shown in FIG. 19, the OPB output selecting section 212 acquires the OPB 1 level V1 from the first optical black area 101 (OPB 1).

In addition, the OPB output selecting section 212 acquires the OPB 2 level V2 from the second optical black area 101 (OPB 2).

In the process of step S2, on the basis of an OPB level acquired from a predetermined optical black area 101, the OPB output selecting section 212 selects the optimum OPB level generating section 211 for the interpolation of the OPB level.

In the process of step S2, in the OPB output selecting section 212, the determining section 212a references the value reference section 212b described above with reference to FIG. 12, with the acquired OPB 1 level V1 and OPB 2 level V2.

The determining section 212a determines the OPB level generating section 211 to be selected as the output destination of an initial level, on the basis of the OPB 1 level V1 acquired from the first optical black area 101 (OPB 1). In addition, the determining section 212a determines the OPB level generating section 211 to be selected as the output destination of an end level, on the basis of the OPB 2 level V2 acquired from the second optical black area 101 (OPB 2).

In this example, it is assumed that the first OPB level generating section 211(1) is selected as the output destination of the OPB 1 level V1, and the third OPB level generating section 211(3) is selected as the output destination of the OPB 2 level V2.

Figure 20:
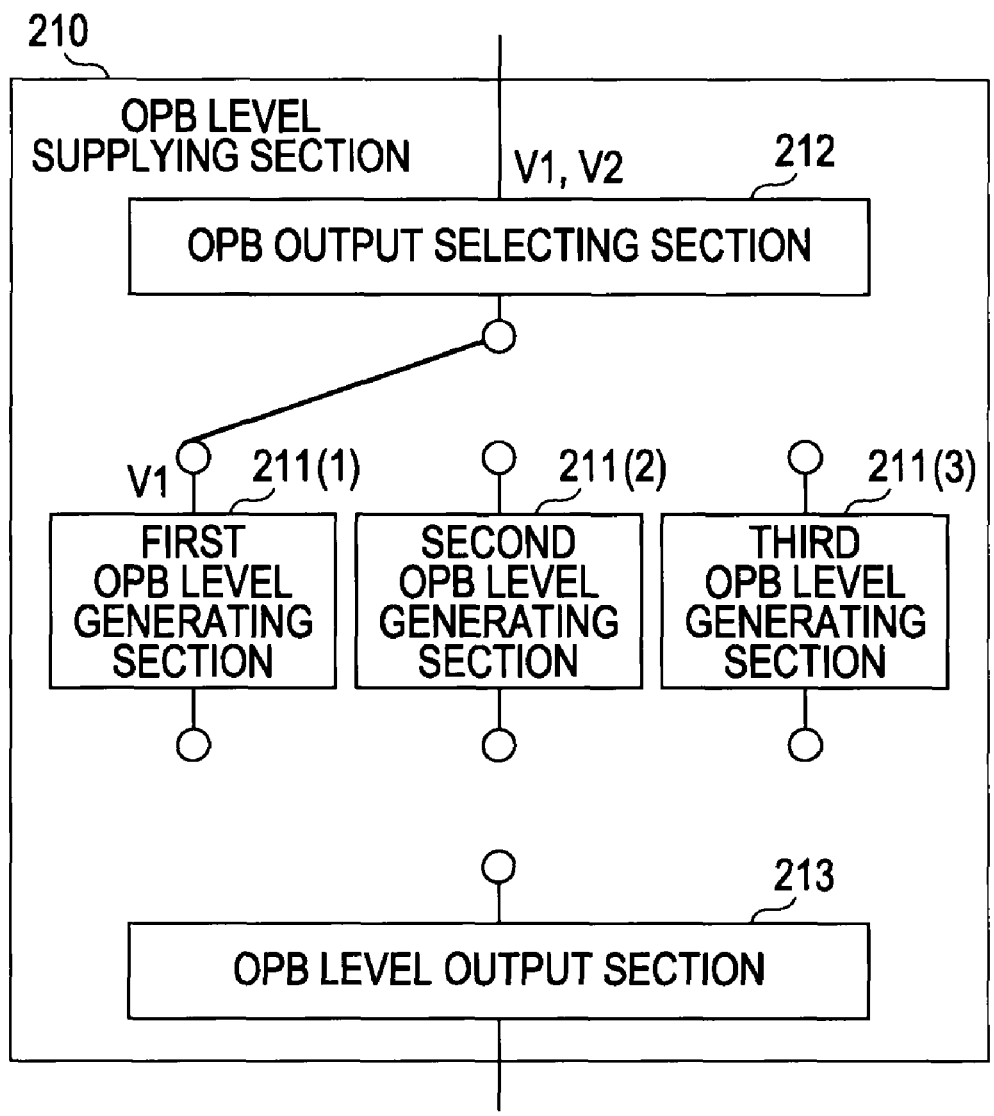
FIG. 20 is an explanatory operation diagram showing an example of processing of the solid-state imaging device according to the first embodiment.

In the process of step S3, as shown in FIG. 20, the OPB output selecting section 212 sets the OPB 1 level V1 acquired from the first optical black area 101 (OPB 1), in the first OPB level generating section 211(1).

In the process of step S3, in the OPB output selecting section 212, the first OPB level generating section 211(1) determined as the output destination of the OPB 1 level V1 by the determining section 212a is selected by the selecting section 212c, and the OPB 1 level V1 is supplied to the first OPB level generating section 211(1).

The first OPB level generating section 211(1) holds the OPB 1 level V1 supplied from the OPB output selecting section 212, in the value holding section 211a.

Figure 21:
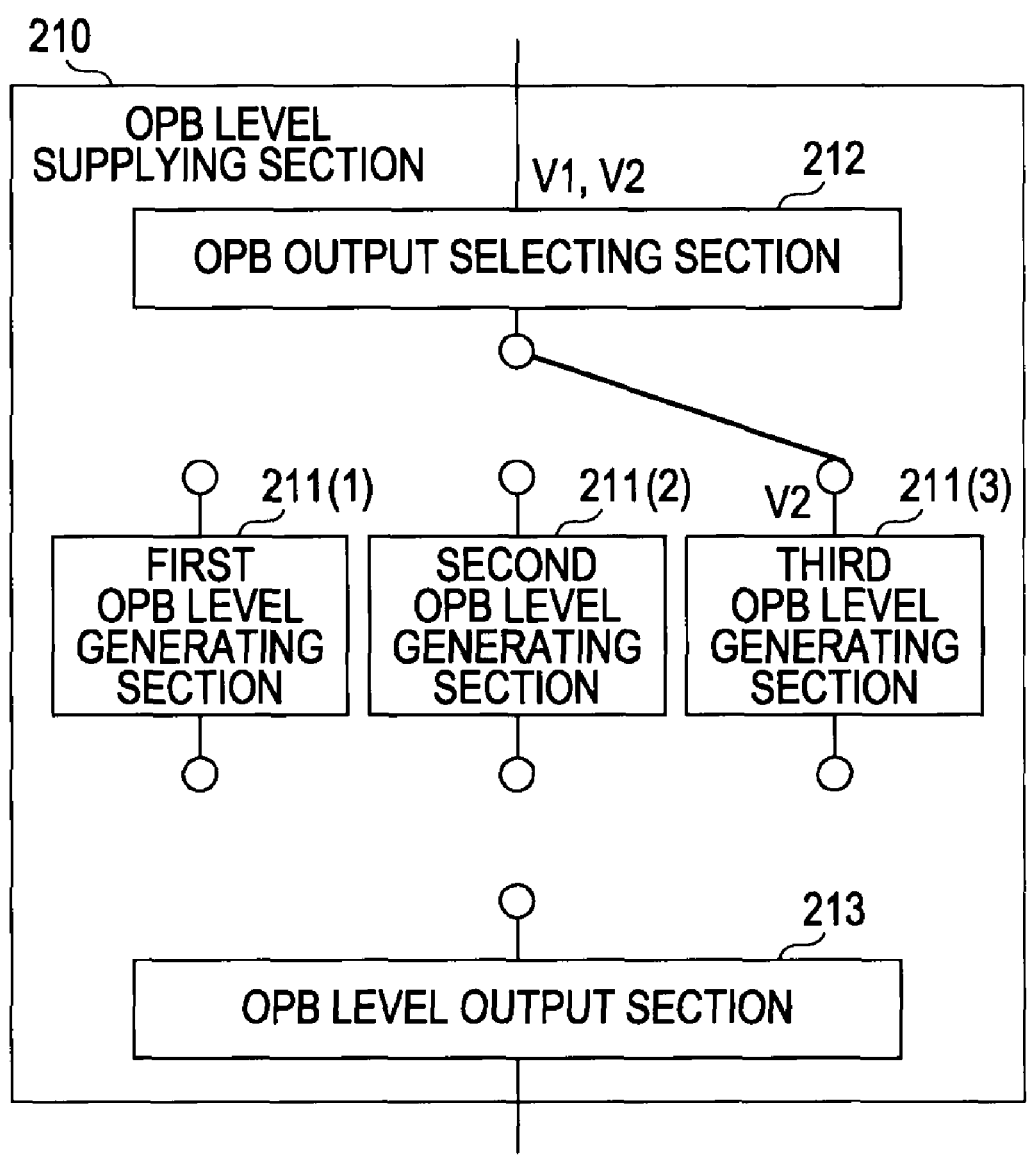
FIG. 21 is an explanatory operation diagram showing an example of processing of the solid-state imaging device according to the first embodiment.

In the process of step S4, as shown in FIG. 21, the OPB output selecting section 212 sets the OPB 2 level V2 acquired from the second optical black area 101 (OPB 2), in the third OPB level generating section 211(3).

In the process of step S4, in the OPB output selecting section 212, the third OPB level generating section 211(3) determined as the output destination of the OPB 2 level V2 by the determining section 212a is selected by the selecting section 212c, and the OPB 2 level V2 is supplied to the third OPB level generating section 211(3).

The third OPB level generating section 211(3) holds the OPB 2 level V2 supplied from the OPB output selecting section 212, in the value holding section 211a.

Figure 22:
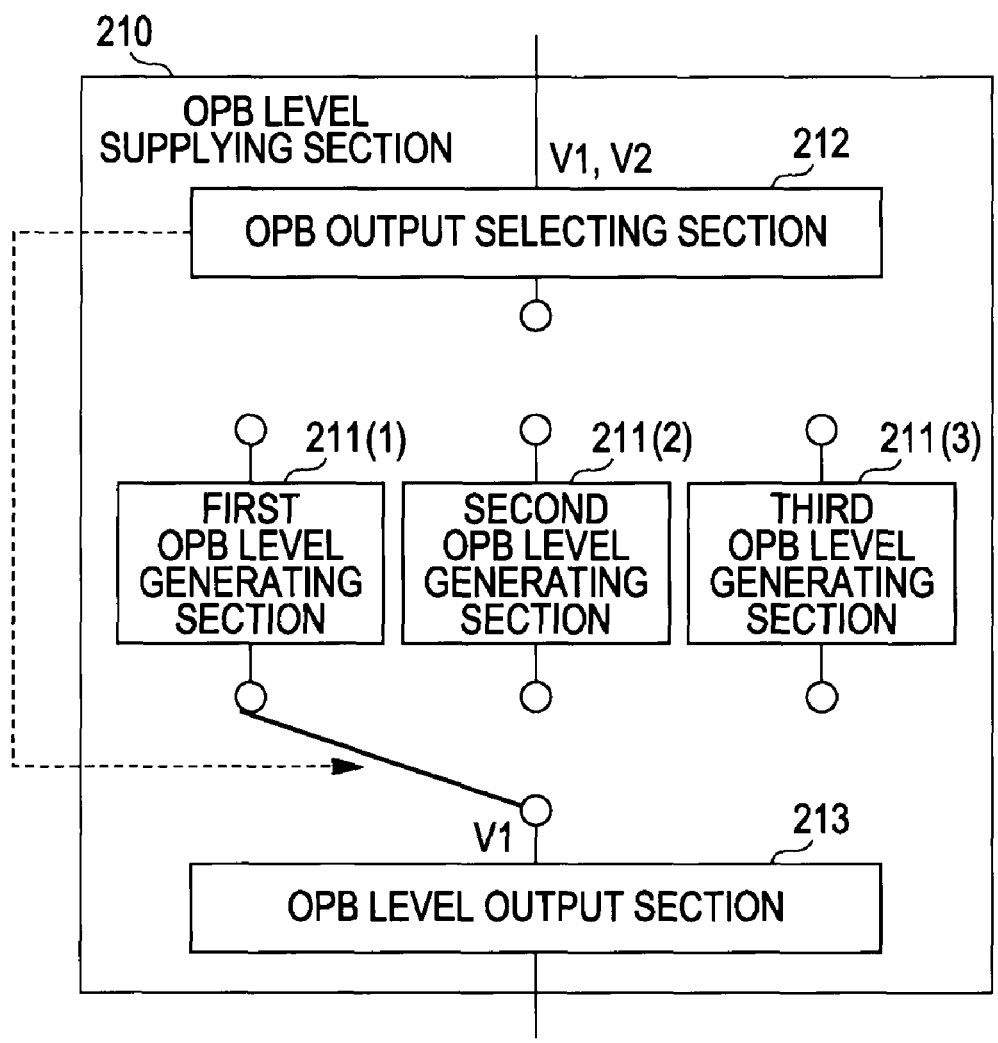
FIG. 22 is an explanatory operation diagram showing an example of processing of the solid-state imaging device according to the first embodiment.

In the process of step S5, as shown in FIG. 22, the OPB output selecting section 212 connects the first OPB level generating section 211(1) and the OPB level output section 213 to each other. In the process of step S5, the first OPB level generating section 211(1) outputs the OPB 1 level 1 held in the value holding section 211a to the OPB level output section 213 by the value output section 211c.

Since the first OPB level generating section 211(1) has no value generating section 211b, the OPB 1 level V1 supplied from the first optical black area 101 (OPB 1) is outputted from the value holding section 211a as it is.

Thus, the OPB level supplying section 210 outputs the OPB level V1 to the CDS section 200 as the initial level of the estimated OPB level $V_{\_OPB}$.

Figure 23:
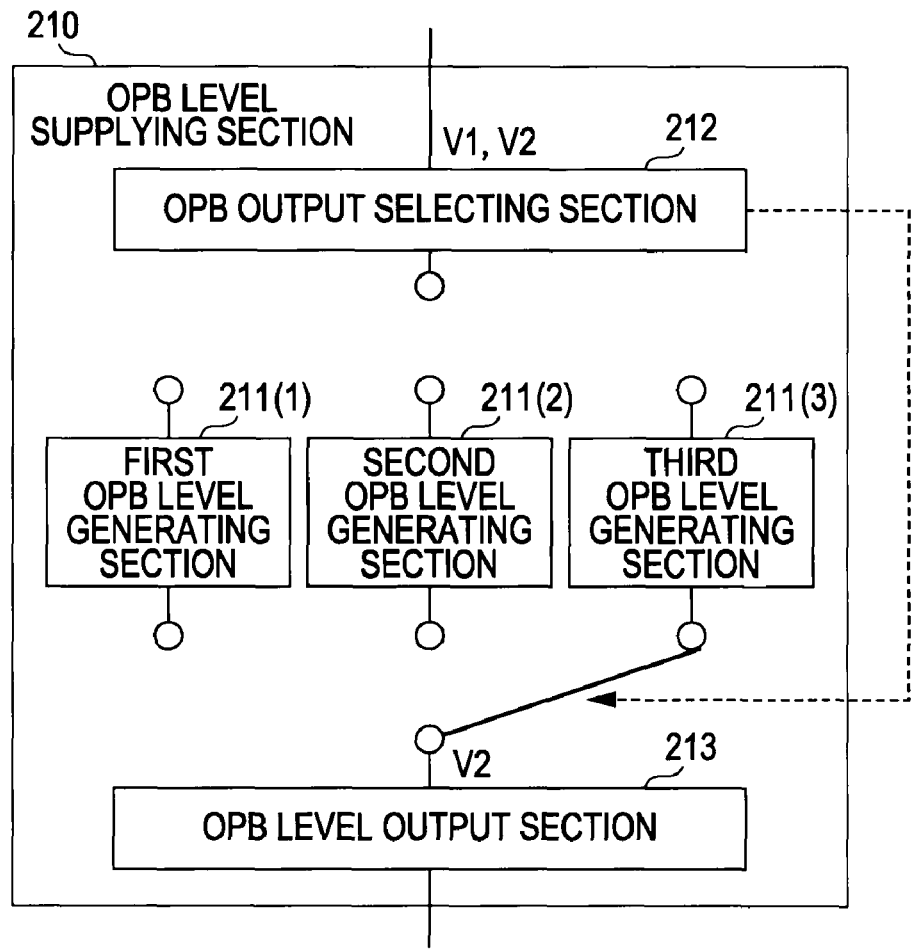
FIG. 23 is an explanatory operation diagram showing an example of processing of the solid-state imaging device according to the first embodiment.

When reading of each row is started in the pixel section 10A, in the process of step S6, as shown in FIG. 23, the OPB output selecting section 212 connects the third OPB level generating section 211(3) and the OPB level output section 213 to each other.

In the process of step S6, the third OPB level generating section 211(3) generates the estimated OPB level $V_{\_OPB}$ by the value generating section 211b from the OPB 2 level V2 held in the value holding section 211a, and outputs the estimated OPB level $V_{\_OPB}$ to the OPB level output section 213 by the value output section 211c.

Figure 24:
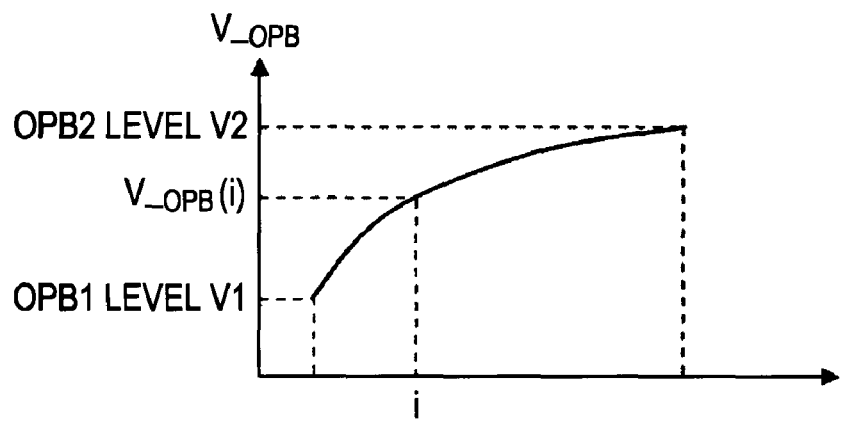
FIG. 24 is a graph showing a specific example of the waveform of an estimated OPB level.

FIG. 24 is a graph showing a specific example of the waveform of an estimated OPB level. In the OPB level supplying section 210, the OPB 1 level V1 held in the first OPB level generating section 211(1) is the initial level of the estimated OPB level $V_{\_OPB}$. In this operation example, the OPB 2 level V2 held in the third OPB level generating section 211(3) is the end level of the estimated OPB level $V_{\_OPB}$.

The estimated OPB level $V_{\_OPB}$ varies between the OPB 1 level V1 and the OPB 2 level V2, depending on the characteristics of the value generating section 211b of the third OPB level generating section 211(3). In the third OPB level generating section 211(3), the value generating section 211b is configured so that the estimated OPB level $V_{\_OPB}$ becomes equal to an estimated value of the i-th row at the time when reading of the i-th row of the effective pixel area 100E is performed.

Stated more specifically in conjunction with the operation of the CDS section 200, in the effective pixel area 100E of the pixel section 10A, the reset level $S_{\_Rst}$ of the first row is read, and held in the second value holding section 202 of the CDS section 200. Next, the data level $S_{\_DATA}$ of the first tow is read, and held in the first value holding section 201 of the CDS section 200.

The OPB level supplying section 210 switches the OPB level generating section to which an OPB level is to be outputted, from the first OPB level generating section 211(1) to the third OPB level generating section 211(3) in this example at the timing when the data level $S_{\_DATA}$ of the first tow is read.

Thus, as the initial level of the estimated OPB level $V_{\_OPB}$, the OPB 1 level V1 is outputted to the CDS section 200. Then, when reading is started from the first row, for example, as shown in FIG. 24, the estimated OPB level $V_{\_OPB}$ that varies in accordance with the position of each of the pixels 100 from which a signal is read is outputted to the CDS section 200.

In the CDS section 200, the data level $S_{\_DATA}$ from which the estimated OPB level $V_{\_OPB}$ has been subtracted is held in the first value holding section 201.

In the configuration according to this example, the optical communication section 11A is placed in the vicinity of the effective pixel area 100E. Thus, there is a possibility that dark current may increase due to the influence of heat generated in the optical communication section 11A.

Accordingly, at the time of starting reading from the first row of the effective pixel area 100E, the initial value of the estimated OPB level $V_{\_OPB}$ is set to the OPB 1 level V1, and when reading is started from the first row, the estimated OPB level $V_{\_OPB}$ is changed in synchronization with the timing at which a signal is read.

The OPB 1 level V1 is a value acquired from the first optical black area 101 (OPB 1) located close to the optical communication section 11A and susceptible to the influence of heat. On the other hand, the OPB 2 level V2 is a value acquired from the second optical black area 101 (OPB 2) located far from the optical communication section 11A and relatively unsusceptible to the influence of heat.

The estimated OPB level $V_{\_OPB}$ varies within a range from the OPB 1 level V1 to the OPB 2 level V2 so that a value estimated on the basis of the position of a pixel is obtained from the relationship between the pixel position and dark current, by using Equations (1) to (5) or the like described above.

Thus, the OPB level can be varied in accordance with the influence of heat generated in the optical communication section 11A, and the OPB level can be subtracted from the data level, thereby making it possible to obtain an output from which the influence of heat is eliminated.

<5. Example of Placement of Optical Communication Section>

[Example of Placement of Optical Communication Section]

Figure 25:
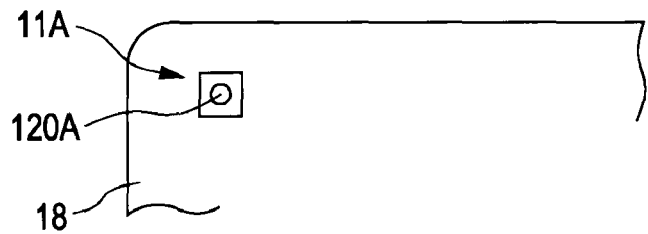
FIG. 25 is a schematic plan view showing an example of the placement of an optical communication section which realizes a single transmission channel.
Figure 26:
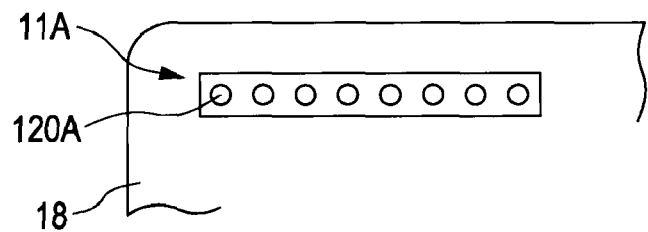
FIG. 26 is a schematic plan view showing an example of the placement of an optical communication section which realizes a plurality of transmission channels.
Figure 27:
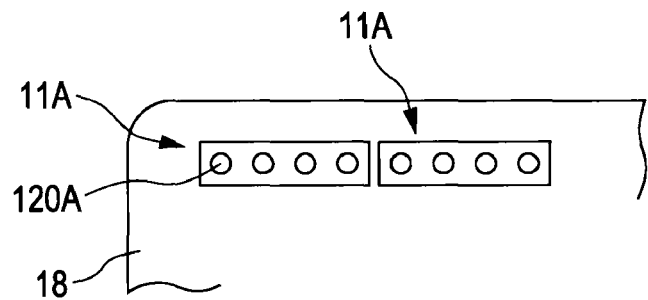
FIG. 27 is a schematic plan view showing an example of the placement of optical communication sections which realizes a plurality of transmission channels.
Figure 28:
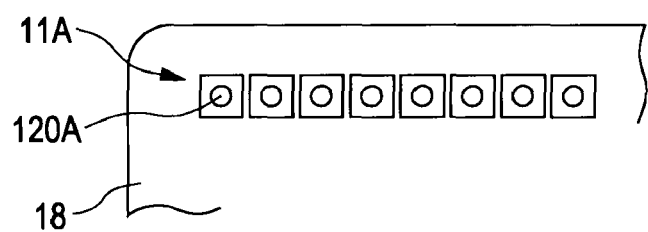
FIG. 28 is a schematic plan view showing an example of the placement of optical communication sections which realizes a plurality of transmission channels.

FIG. 25 is a schematic plan view showing an example of the placement of an optical communication section which realizes a single transmission channel. FIGS. 26 to 28 are schematic plan views each showing an example of the placement of an optical communication section which realizes a plurality of transmission channels.

As shown in FIG. 25, the solid-state imaging device 1A is configured to perform signal transmission by light via a single channel when provided with a single optical communication section 11A having a single optical output section 120A. In addition, as shown in FIGS. 26 and 27, the solid-state imaging device 1A is configured to perform signal transmission by light via a plurality of channels when provided with a single or a plurality of optical communication sections 11A in which a plurality of optical output sections 120A are arrayed. Further, as shown in FIG. 28, the solid-state imaging device 1A is also configured to perform signal transmission by light via a plurality of channels when provided with a plurality of optical communication sections 11A each having a single optical output section 120A.

In a case where the solid-state imaging device 1A is configured to perform serial transmission of, for example, n-bit (n>1) signals outputted from the A/D conversion section 12A, it is possible to perform signal transmission by light via a single channel.

For example, by generating a digital signal serialized by superimposing synchronizing signals and a clock signal on data signals, it is possible to perform signal transmission via a single channel. Thus, as shown in FIG. 25, the solid-state imaging device 1A realizes serial transmission by provision of a single optical communication section 11A having a single optical output section 120A.

In a case where the solid-state imaging device 1A is configured to transmit serialized data signal and clock signal via independent channels, it is possible to perform signal transmission by light via a plurality of (two) channels.

The solid-state imaging device 1A realizes serial transmission for transmitting a clock signal independently, by provision of two optical communication sections 11A each having a single optical output section 120A. Alternatively, the solid-state imaging device 1A realizes serial transmission for transmitting a clock signal independently, also by provision of a single optical communication section 11A in which two optical output sections 120A are arrayed.

Further, in a case where the solid-state imaging device 1A is configured to perform parallel transmission of n-bit digital signals outputted from the A/D conversion section 12A, it is possible to perform signal transmission by light via a plurality of channels.

The solid-state imaging device 1A realizes parallel transmission by provision of a single optical communication section 11A in which a number of optical output sections 120A equal to the number of transmission channels are arrayed. For example, in the case of a configuration in which 8-bit digital signals are to be transmitted in parallel, as shown in FIG. 26, the solid-state imaging device 1A may be provided with a single optical communication section 11A in which eight optical output sections 120A are arrayed.

Alternatively, the solid-state imaging device 1A realizes parallel transmission by provision of a plurality of optical communication sections 11A in each of which a plurality of optical output sections 120A are arrayed, so that the number of optical output sections 120A becomes equal to the number of transmission channels. For example, in the case of a configuration in which 8-bit digital signals are to be transmitted in parallel, as shown in FIG. 27, the solid-state imaging device 1A may be provided with two optical communication sections 11A in each of which four optical output sections 120A are arrayed.

Alternatively, the solid-state imaging device 1A realizes parallel transmission by provision of a number of optical communication sections 11A each having a single optical output section 120A equal to the number of transmission channels. For example, in the case of a configuration in which 8-bit digital signals are to be transmitted in parallel, as shown in FIG. 28, the solid-state imaging device 1A may be provided with eight optical communication sections 11A each having a single optical output section 120A.

[Example of Configuration of Solid-state Imaging Device with Optical Communication Section in Concentrated Placement]

Figure 29:
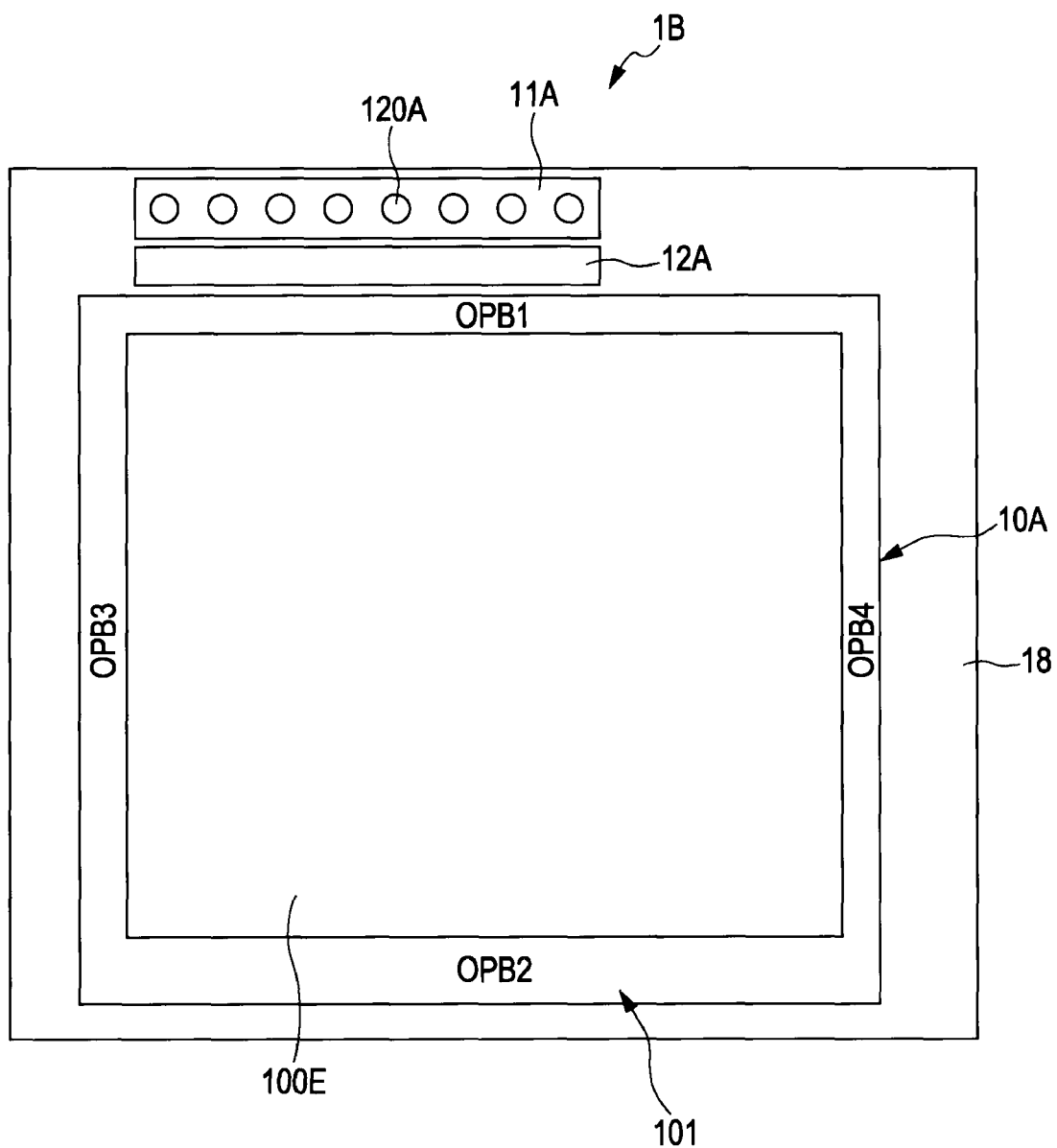
FIG. 29 is a schematic plan view of a solid-state imaging device with an optical communication section in a concentrated placement.

FIG. 29 is a schematic plan view of a solid-state imaging device with an optical communication section in a concentrated placement. Components such as scanning circuits and a CDS section are not shown in FIG. 29. In a solid-state imaging device 1B shown in FIG. 29, the optical black area 101 is formed around the effective pixel area 100E in the pixel section 10A.

As described above, in the optical black area 101, the first optical black area 101 (OPB 1) and the second optical black area 101 (OPB 2) are placed along one sides across the effective pixel area 100E. The third optical black area 101 (OPB 3) and the fourth optical black area 101 (OPB 4) are placed along the other sides across the effective pixel area 100E.

In the optical communication section 11A, a plurality of optical output sections 120A are arrayed, and placed in a single location on the substrate 18 near the first optical black area 101 (OPB 1) of the pixel section 10A.

Such placement of the optical communication section 11A with a plurality of optical output sections 120A concentrated in a single location will be referred to as concentrated placement. In the case of a configuration in which the optical communication section 11A is placed in a concentrated placement, for example, the optical communication section 11A is placed in such a way that the plurality of optical output sections 120A are arrayed in parallel in a direction along the first optical black area 101 (OPB 1).

In addition, examples of concentrated placement also include a mode of placement in which, as shown in FIG. 27, a plurality of optical communication sections 11A each having an array of a plurality of optical output sections 120A are provided, and are placed so as to be concentrated in a single location on the substrate 18 near the first optical black area 101 (OPB 1).

Likewise, examples of concentrated placement also include a mode of placement in which, as shown in FIG. 28, a plurality of communication sections 11A each having a single optical output section 120A are provided, and are placed so as to be concentrated in a single location on the substrate 18 near the first optical black area 101 (OPB 1). It should be noted that examples of concentrated placement also include a mode of placement in which, as shown in FIG. 25, a single optical communication section 11A having a single optical output section 120A is placed in a single location on the substrate 18 near the first optical black area 101 (OPB 1).

The solid-state imaging device 1B with the optical communication section(s) 11A in a concentrated placement is configured such that the length of the signal wiring between the A/D conversion section 12A and the optical communication section 11A becomes short, by placing the individual optical output sections 120A close to and in rear of a single A/D conversion section 12A. In addition, the solid-state imaging device 1B is configured such that circuits serving as heat sources are concentrated near the first optical black area 101 (OPB 1).

In the case of the solid-state imaging device 1B with the optical communication section(s) 11A in a concentrated placement, the optical communication section(s) 11A serving as a heat generation source can be concentrated in a single location near the first optical black area (OPB 1). Thus, the influence of heat generated in the optical communication section(s) 11A can be reliably reflected on the dark current in the first optical black area (OPB 1).

[Example of Configuration of Solid-state Imaging Device with Optical Communication Sections Placed in Dispersed Placement]

Figure 30:
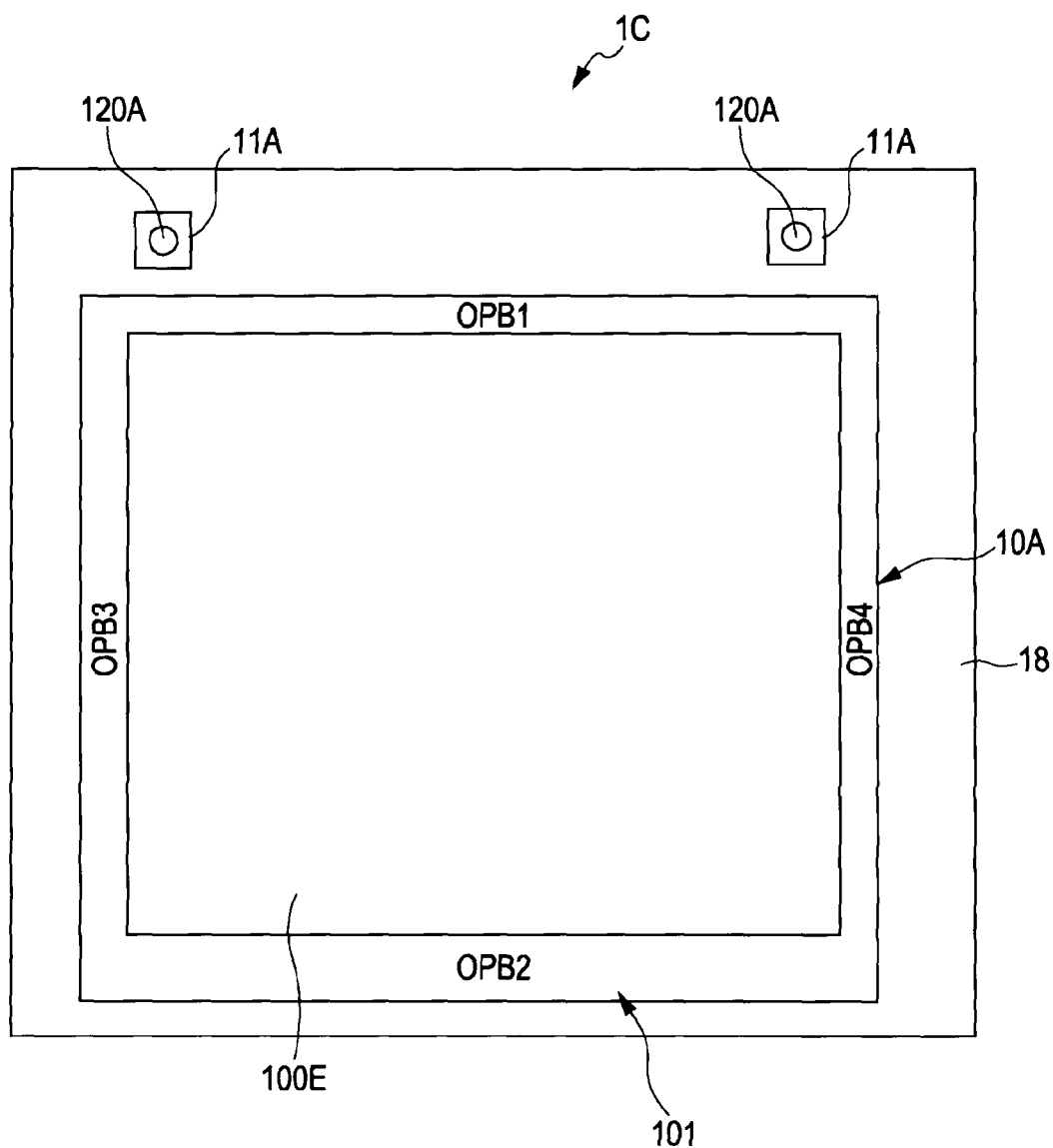
FIG. 30 is a schematic plan view of a solid-state imaging device with optical communication sections in a dispersed placement.

FIG. 30 is a schematic plan view of a solid-state imaging device with optical communication sections in a dispersed placement. Components such as scanning circuits, a CDS section, and an A/D conversion section are not shown in FIG. 30. In a solid-state imaging device 1C shown in FIG. 30, a plurality of optical communication sections 11A each having a single optical output section 120A are placed so as to be dispersed across a plurality of locations on the substrate 18 near the first optical black area 101 (OPB 1). Such placement of the optical communication sections 11A with a single optical output section 120A dispersed across a plurality of locations will be referred to as dispersed placement.

In the solid-state imaging device 1C with the optical communication sections 11A in a dispersed placement, the placement of the individual optical communication sections 11A is determined so that the distance between the optical communication sections 11A becomes as large as possible. Typically, a solid-state imaging device is a square, and the optical communication sections 11A are placed at opposite ends along the first optical black area 101 (OPB 1).

In the solid-state imaging device 1C with the optical communication sections 11A in a dispersed placement, digital signals are transmitted in parallel by synchronizing a plurality of optical output sections 120A with each other. Thus, each individual optical communication section 11A is responsible for signal transmission equivalent to 1 bit of parallel transmission, thereby making it possible to make the amount of signal transmission outputted from each optical communication section 11A small. Therefore, the amount of heat generated by each individual optical communication section 11A becomes small in comparison to an optical communication section in which optical output sections are arrayed.

Thus, by dispersed placement of the optical communication sections 11A on the substrate 18, heat generated by the optical communication sections 11A can be dispersed across the entire solid-state imaging device 1C.

[Example of Configuration of Solid-state Imaging Device with Optical Communication Sections in Dispersed Concentrated Placement]

Figure 31:
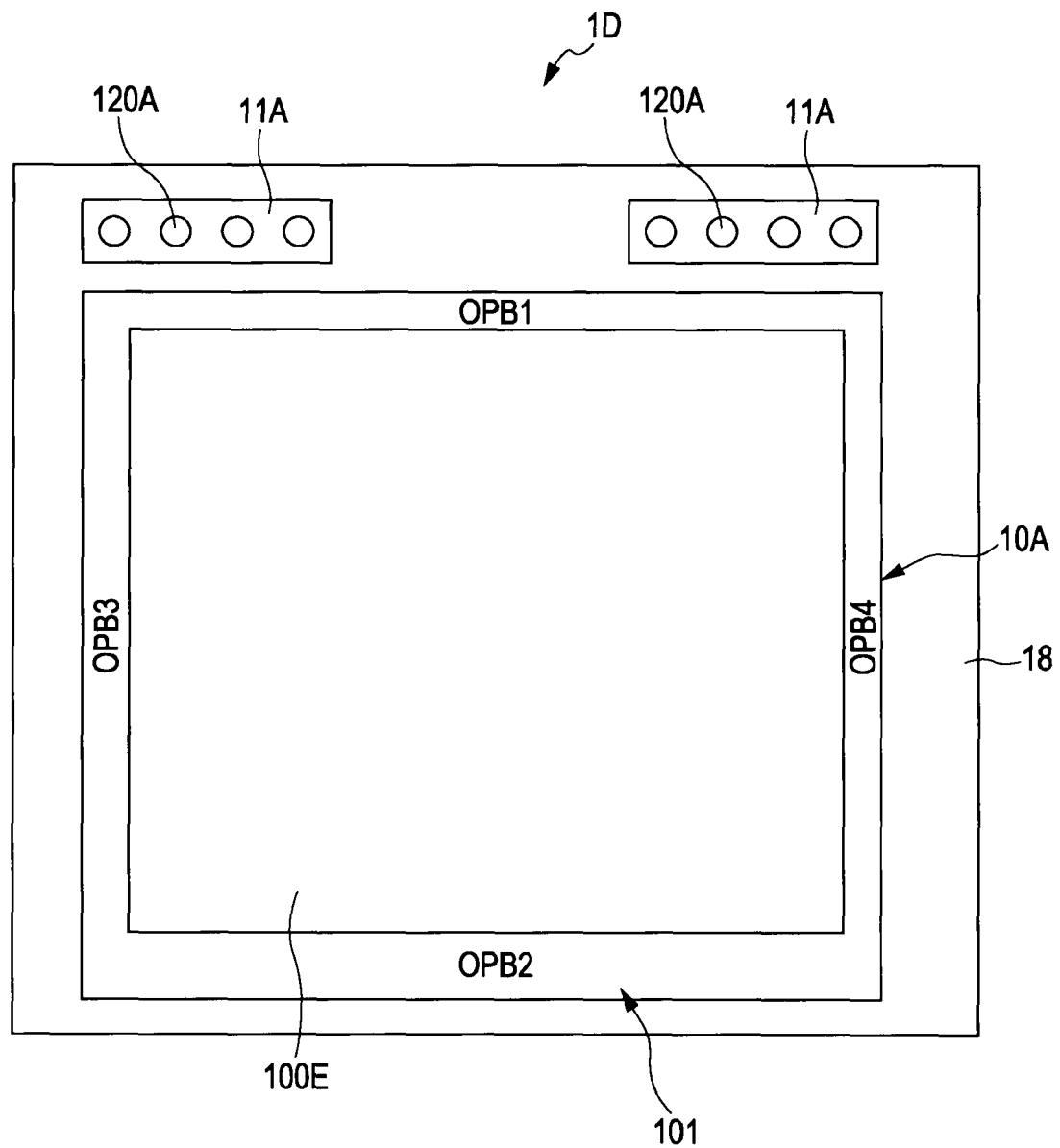
FIG. 31 is a schematic plan view of a solid-state imaging device with optical communication sections placed in a dispersed concentrated placement.

FIG. 31 is a schematic plan view of a solid-state imaging device with optical communication sections in a dispersed concentrated placement. Components such as scanning circuits, a CDS section, and an A/D conversion section are not shown in FIG. 31. In a solid-state imaging device 1D shown in FIG. 31, a plurality of optical communication sections 11A each having a plurality of optical output sections 120A are placed so as to be dispersed across a plurality of locations on the substrate 18 near the first optical black area 101 (OPB 1). Such placement of the optical communication sections 11A with a plurality of optical output sections 120A dispersed across a plurality of locations will be referred to as dispersed concentrated placement.

In the solid-state imaging device 1D with the optical communication sections 11A in a dispersed concentrated placement, by the concentrated placement of the plurality of optical communication sections, the influence of heat generated in the optical communication sections 11A can be reliably reflected on the dark current in the first optical black area (OPB 1). In addition, by dispersing the optical communication sections placed in a concentrated placement, local temperature rise can be suppressed.

<6. Example of Placement of Light-Shielding Section>

In the solid-state imaging device according to each of the embodiments described above, the optical communication section 11A is placed near the first optical black area 101 (OPB 1). Since the first optical black area (OPB 1) is formed along one side of the effective pixel area 100E, the distance between the effective pixel area 100E and the optical communication section 11A also becomes short.

Therefore, in the case of a configuration in which the optical communication section 11A includes a self-emission type optical output section, light shielding is necessary so that signal light outputted from the optical communication section 11A, and light that leaks from the optical communication section 11A are not incident on the effective pixel area 100E. In addition, light shielding is also necessary so that light incident on the effective pixel area 100E is not mixed into signal light outputted from the optical communication section 11A.

Figure 32:
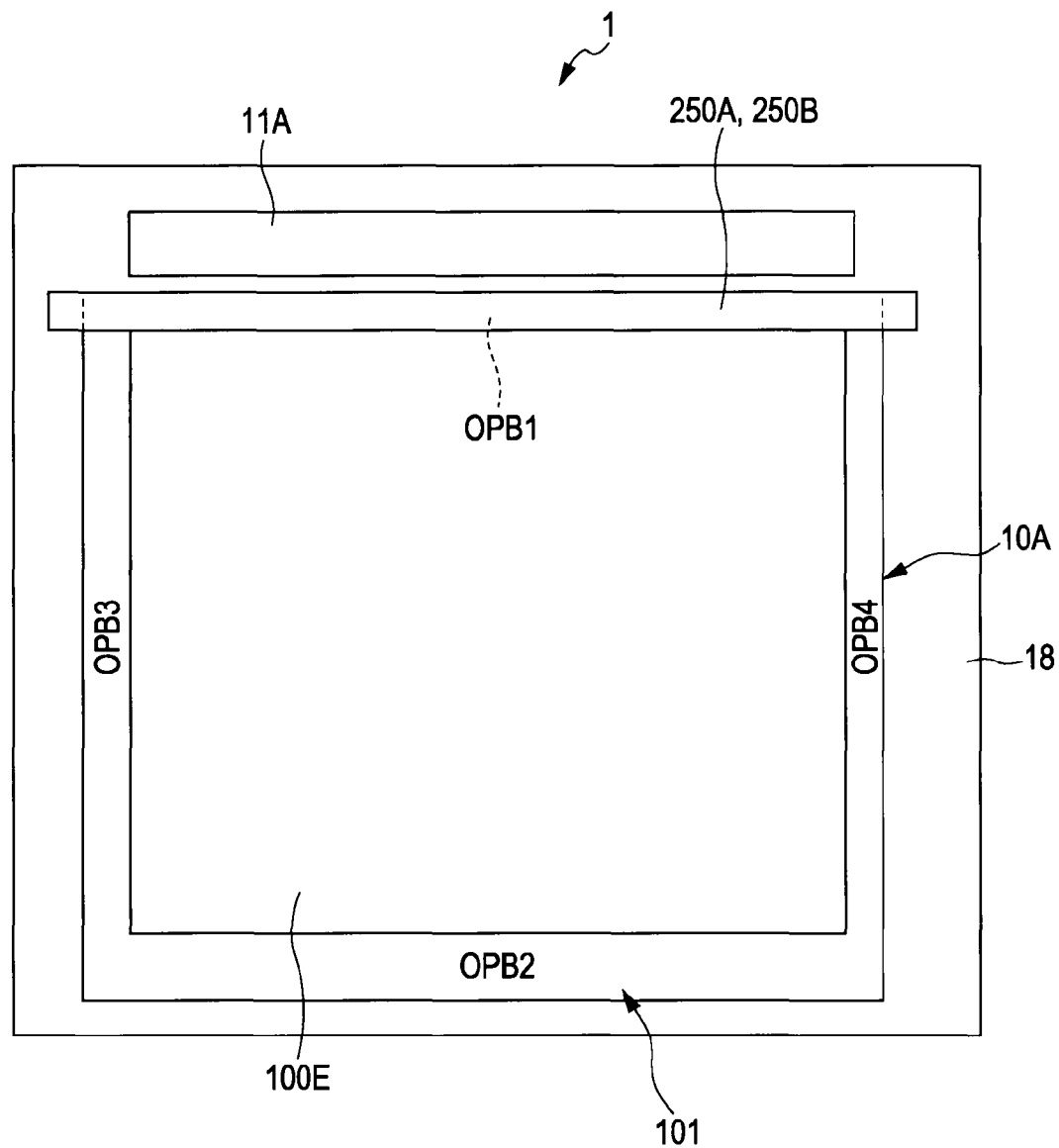
FIG. 32 is a schematic plan view showing an example of a solid-state imaging device including a light-shielding section.
Figure 33:
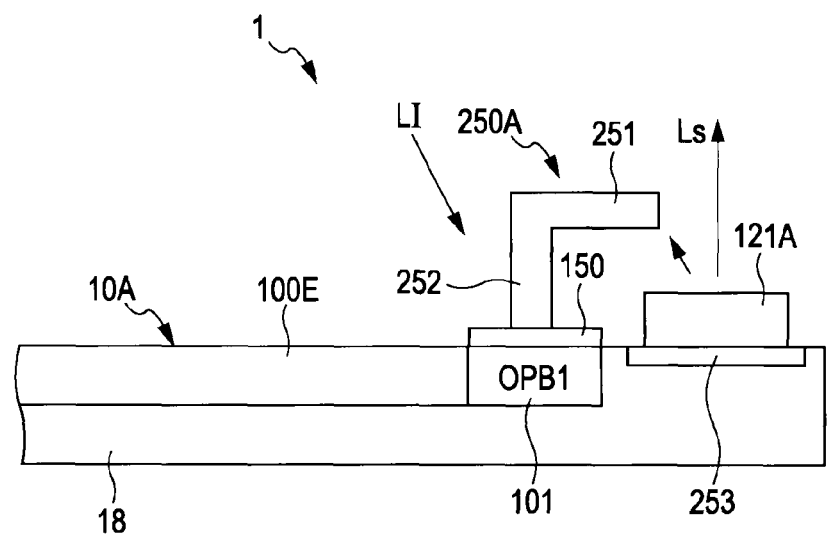
FIG. 33 is a schematic side view showing an example of a solid-state imaging device including a light-shielding section.
Figure 34:
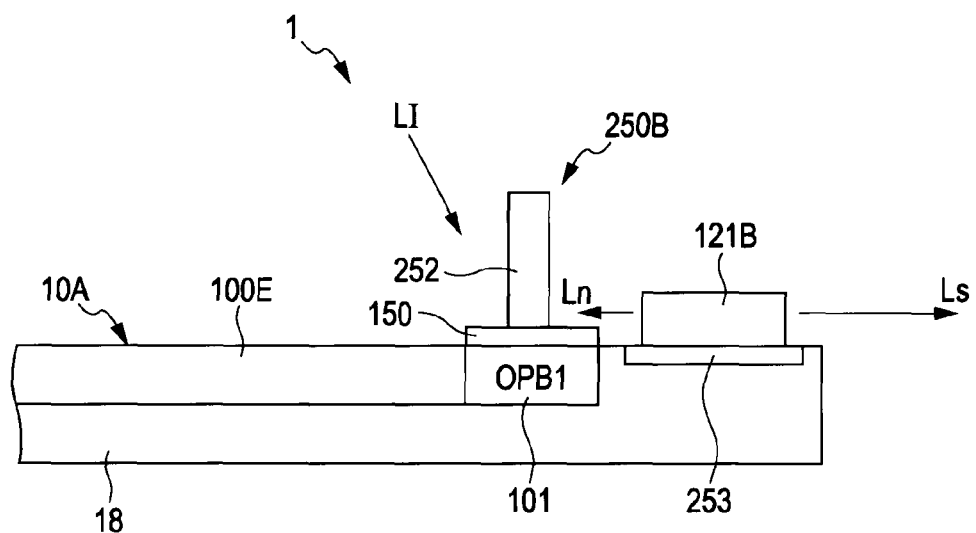
FIG. 34 is a schematic side view showing an example of a solid-state imaging device including a light-shielding section.

FIGS. 32, 33, and 34 each show an example of configuration of a solid-state imaging device including a light-shielding section. FIG. 32 is a schematic plan view showing an example of a solid-state imaging device including a light-shielding section. FIGS. 33 and 34 are schematic side views each showing an example of a solid-state imaging device including a light-shielding section.

In the solid-state imaging device 1, the optical black area 101 is formed around the effective pixel area 100E in the pixel section 10A. In the optical black area 101, a light-shielding layer 150 made of aluminum or the like is formed on the light incidence surface side of the effective pixel area 100E. Thus, no light is incident on the optical black area 101.

As described above, in the optical black area 101, the first optical black area 101 (OPB 1) and the second optical black area 101 (OPB 2) are placed along one sides across the effective pixel area 100E. The third optical black area 101 (OPB 3) and the fourth optical black area 101 (OPB 4) are placed along the other sides across the effective pixel area 100E.

The optical communication section 11A is placed on the front surface side of the substrate 18, near the first optical black area 101 (OPB 1) of the pixel section 10A. In the example shown in FIG. 33, the optical communication section 11A includes a surface-emitting semiconductor laser (VCSEL) 121A as a self-emission type optical output section.

The upper surface of the surface-emitting semiconductor laser 121A is a light-emitting surface, from which signal light Ls is outputted in the direction indicated by an arrow. A slight amount of leakage light is outputted from the lower surface of the surface-emitting semiconductor laser 121A opposite to the light-emitting surface.

The solid-state imaging device 1 includes a light-shielding section 250A above the first optical black area 101 (OPB 1). The light-shielding section 250A is made of such a material that shields light of the oscillation frequency of the surface-emitting semiconductor laser 121A, and light LI that is incident on the pixel section 10A.

The light-shielding section 250A includes a light-shielding plate 251 that shields a component of the signal light Ls outputted from the surface-emitting semiconductor layer 121A which goes toward the pixel section 10A. In addition, the light-shielding section 250A includes a light-shielding plate 252 that shields a component of the signal light LI incident on the pixel section 10A which goes toward the surface-emitting semiconductor layer 121A. Further, a light-shielding section 253 is provided on the lower surface of the surface-emitting semiconductor layer 121A.

Thus, in the solid-state imaging device 1, the component of the signal light Ls outputted from the surface-emitting semiconductor layer 121A which goes toward the pixel section 10A is shielded by the light-shielding plate 251 of the light-shielding section 250A. Therefore, it is possible to prevent the signal light Ls outputted from the surface-emitting semiconductor layer 121A from being incident on the effective pixel area 100E of the pixel section 10A.

In addition, in the solid-state imaging device 1, the component of the light LI incident on the pixel section 10A which goes toward the pixel section 10A is shielded by the light-shielding plate 252 of the light-shielding section 250A. Therefore, it is possible to prevent light incident on the pixel section 10A from being mixed into the signal light Ls outputted from the surface-emitting semiconductor laser 121A.

Further, in the solid-state imaging device 1, light that leaks from the lower surface of the surface-emitting semiconductor laser 121A is shielded by the light-shielding section 253. Therefore, it is possible to prevent the light that leaks from the lower surface of the surface-emitting semiconductor laser 121A from reaching the pixel section 10A from inside the substrate 18.

In the example shown in FIG. 34, the optical communication section 11A includes an edge-emitting semiconductor laser 121B as a self-emission type optical output section.

One side surface of the edge-emitting semiconductor laser 1213 is a light-emitting surface, from which the signal light Ls is outputted in the direction indicated by an arrow. A slight amount of the leakage light Ln is outputted from the other side surface of the edge-emitting semiconductor laser 1218 opposite to the light-emitting surface.

The solid-state imaging device 1 includes a light-shielding section 250B above the first optical black area 101 (OPB 1). The light-shielding section 250B is made of such a material that shields light of the oscillation frequency of the edge-emitting semiconductor laser 121B, and light that is incident on the pixel section 10A.

The light-shielding section 250B has a light-shielding plate 252 that shields components of the leakage light Ln outputted from the edge-emitting semiconductor laser 121B and the light LI incident on the pixel section 10A which go toward the edge-emitting semiconductor laser 121B.

Thus, in the solid-state imaging device 1, the leakage light Ln that goes toward the pixel section 10A from the edge-emitting semiconductor laser 121B is shielded by the light-shielding plate 252 of the light-shielding section 250B. Therefore, it is possible to prevent the leakage light Ln outputted from the edge-emitting semiconductor laser 121B from being incident on the effective pixel area 100E of the pixel section 10A.

In addition, in the solid-state imaging device 1, the component of the light incident on the pixel section 10A which goes toward the edge-emitting semiconductor laser 121B is shielded by the light-shielding plate 252 of the light-shielding section 250B. Therefore, it is possible to prevent the light incident on the pixel section 10A from being mixed into the signal light Ls outputted from the edge-emitting semiconductor laser 121B.

The solid-state imaging device 1 including the light-shielding section 250A, 250B may be any one of the solid-state imaging devices 1A to 1D described above.

In the solid-state imaging device 1, the light-shielding section 250A, 250B is formed above the first optical black area 101 (OPB 1). Thus, the space necessary for placing the light-shielding section 250A, 250B can be shared with the first optical black area 101 (OPB 1), thereby making it possible to prevent the size of the substrate 18 from increasing due to the placement of the light-shielding section 250A, 250B.

<Example of Configuration of Signal Processing System Including Solid-state Imaging Device>

[Example of Configuration of Optical Apparatus]

Figure 35:
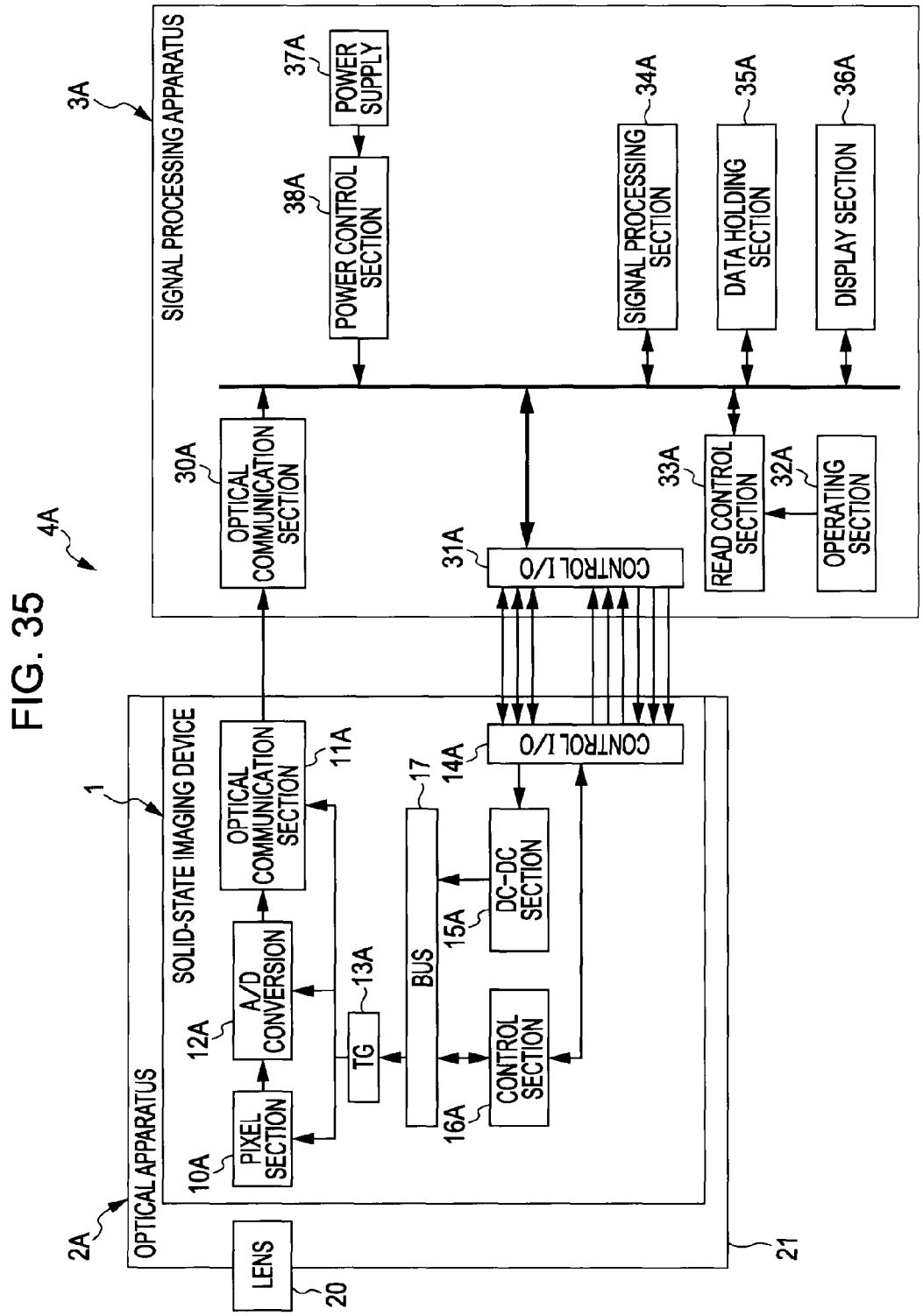
FIG. 35 is a functional block diagram showing an overview of a signal processing system including an optical apparatus and a signal processing apparatus.

FIG. 35 is a functional block diagram showing an overview of a signal processing system including a solid-state imaging device. First, an overview of an optical apparatus including a solid-state imaging device will be described. An optical apparatus 2A includes the solid-state imaging device 1 described above, a lens section 20, and a housing 21 in which the solid-state imaging device 1, the lens section 20, and the like are mounted. The optical apparatus 2A constitutes, for example, the lens unit of a camera system. The lens section 20 is an example of optical device, and is formed by a single lens or a combination of a plurality of lenses.

The optical apparatus 2A is configured such that the pixel section 10A of the solid-state imaging device 1 coincides with the focus position of the lens section 20. An image of light incident from the lens section 20 is formed on the pixel section 10A of the solid-state imaging device 1.

The optical apparatus 2A includes, for example, a focusing mechanism that moves the lens section 20 in the optical axis direction with respect to the solid-state imaging device 1, so that the focus position of the lens section 20 is coincident with the pixel section 10A of the solid-state imaging device 1, irrespective of the distance to an imaging object.

[Example of Configuration of Signal Processing Apparatus]

Next, a description will be given of an overview of a signal processing apparatus to which the optical apparatus is connected. A signal processing apparatus 3A includes an optical communication section 30A that converts an optical signal into an electric signal, and a control I/O 31A to/from which a control signal or the like is inputted/outputted. The signal processing apparatus 3A constitutes, for example, the main body portion of a camera system. When the signal processing apparatus 3A is connected with the optical apparatus 2A, the optical communication section 30A is optically coupled to the optical communication section 11A of the solid-state imaging device 1. In addition, the control I/O 31A is connected to the control I/O 14A of the solid-state imaging device 1.

The signal processing apparatus 3A includes an operating section 32A that accepts an operation made by the user, and a read control section 33A that instructs the solid-state imaging device 1 of the optical apparatus 2A to read a pixel signal.

The signal processing apparatus 3A instructs the solid-state imaging device 1 of the optical apparatus 2A to read a pixel signal, from the control I/O 31A, and performs optical communication between the optical communication section 30A of the own apparatus and the optical communication section 11A of the solid-state imaging device 1 to acquire the pixel signal from the solid-state imaging device 1.

The optical communication section 30A has a light-receiving device such as a photodiode (PD) as a light-receiving section. The signal light Ls outputted from the optical communication section 11A of the solid-state imaging device 1 is inputted to the optical communication section 30A, and a pixel signal inputted as an optical signal is converted into an electric signal and outputted.

The signal processing apparatus 3A includes a signal processing section 34A that generates image data by performing predetermined signal processing on the pixel signal acquired by optical communication with the solid-state imaging device 1. In addition, the signal processing apparatus 3A includes a data holding section 35A that holds the pixel signal acquired from the solid-state imaging device 1, and a display section 36A that displays an image from the image data generated by the signal processing section 34A.

The signal processing apparatus 3A includes a power supply 37A that supplies power to the own apparatus and the optical apparatus 2A, and a power supply control section 38A that controls supply of power. The power supply control section 38A performs power supply control so as to switch supply/non-supply of power to the signal processing apparatus 3A, and supply/non-supply of power to the optical apparatus 2A in a predetermined order, on the basis of an operation of turning ON and OFF the power to the signal processing apparatus 3A.

[Example of Configuration of Signal Processing System]

Next, a description will be given of an overview of a signal processing system including an optical apparatus and a signal processing apparatus. A signal processing system 4A includes the optical apparatus 2A and the signal processing apparatus 3A described above, and constitutes, for example, a camera system. In the camera system, the optical apparatus 2A constituting a lens unit is configured to be detachable and interchangeable with respect to the signal processing apparatus 3A constituting a camera main body portion.

In the signal processing system 4A, when the optical apparatus 2A is connected to the signal processing apparatus 3A, the optical communication section 30A of the signal processing apparatus 3A, and the optical communication section 11A of the solid-state imaging device 1 constituting the optical apparatus 2A are optically coupled together. In addition, the control I/O 31A of the signal processing apparatus 3A, and the control I/O 14A of the solid-state imaging device 1 are connected to each other.

Thus, in the signal processing system 4A, data is inputted/outputted as an optical signal between the optical apparatus 2A and the signal processing apparatus 3A, by the optical communication section 11A of the solid-state imaging device 1 and the optical communication section 30A of the signal processing apparatus 3A.

In addition, in the signal processing system 4A, a control signal is inputted/outputted between the signal processing apparatus 3A and the optical apparatus 2A, by the control I/O 31A of the signal processing apparatus 3A and the control I/O 14A of the solid-state imaging device 1.

Further, in the signal processing system 4A, supply of power is performed between the signal processing apparatus 3A and the optical apparatus 2A, by the control I/O 31A of the signal processing apparatus 3A and the control I/O 14A of the solid-state imaging device 1.

In the signal processing system 4A, a user's operation is accepted by the operating section 32A of the signal processing apparatus 3A, and on the basis of an operation on the operating section 32A, the read control section 33A of the signal processing apparatus 3A outputs a control signal for instructing reading of a pixel signal.

In the signal processing system 4A, a control signal for instructing reading of pixel data is inputted to the solid-state imaging device 1 of the optical apparatus 2A, by the control I/O 31A of the signal processing apparatus 3A and the control I/O 14A of the optical apparatus 2A.

In the signal processing system 4A, when the control signal for instructing reading of a pixel signal is inputted to the solid-state imaging device 1 of the optical apparatus 2A, the control section 16A of the solid-state imaging device 1 generates a drive clock by the timing generator 13A.

The drive clock generated by the timing generator 13A is supplied to the pixel section 10A, the A/D conversion section 12A, and the optical communication section 11A, and pixel data is read as an electric signal un the pixel section 10A. In the A/D conversion section 12A, the pixel data read from the pixel section 10A is inputted, and is converted into a digital signal and outputted. In the optical communication section 11A, the electric signal converted into a digital signal in the A/D conversion section 12A is inputted, and a pixel signal is converted into the signal light Ls and outputted.

In the signal processing system 4A, a pixel signal read by the solid-state imaging device 1 is inputted to the signal processing apparatus 3A via optical communication, by the optical communication section 11A of the solid-state imaging device 1 and the optical communication section 30A of the signal processing apparatus 3A.

In the signal processing system 4A, when the pixel signal read by the solid-state imaging device 1 is inputted to the signal processing apparatus 3A via optical communication, the optical communication section 30A of the signal processing apparatus 3A converts the pixel signal inputted as an optical signal into an electric signal and outputs the electric signal.

In the signal processing system 4A, the signal processing section 34A of the signal processing apparatus 3A generates image data by performing predetermined signal processing on the pixel signal converted into an electric signal in the optical communication section 30A of the signal processing apparatus 3A, and the corresponding image is displaced on the display section 36A, for example.

<8. Example of Embodiment of Optical Communication Section According to Mode of Signal Transmission in Signal Processing System>

[Example of Parallel Transmission by Arrayed Optical Communication Section]

Figure 36:
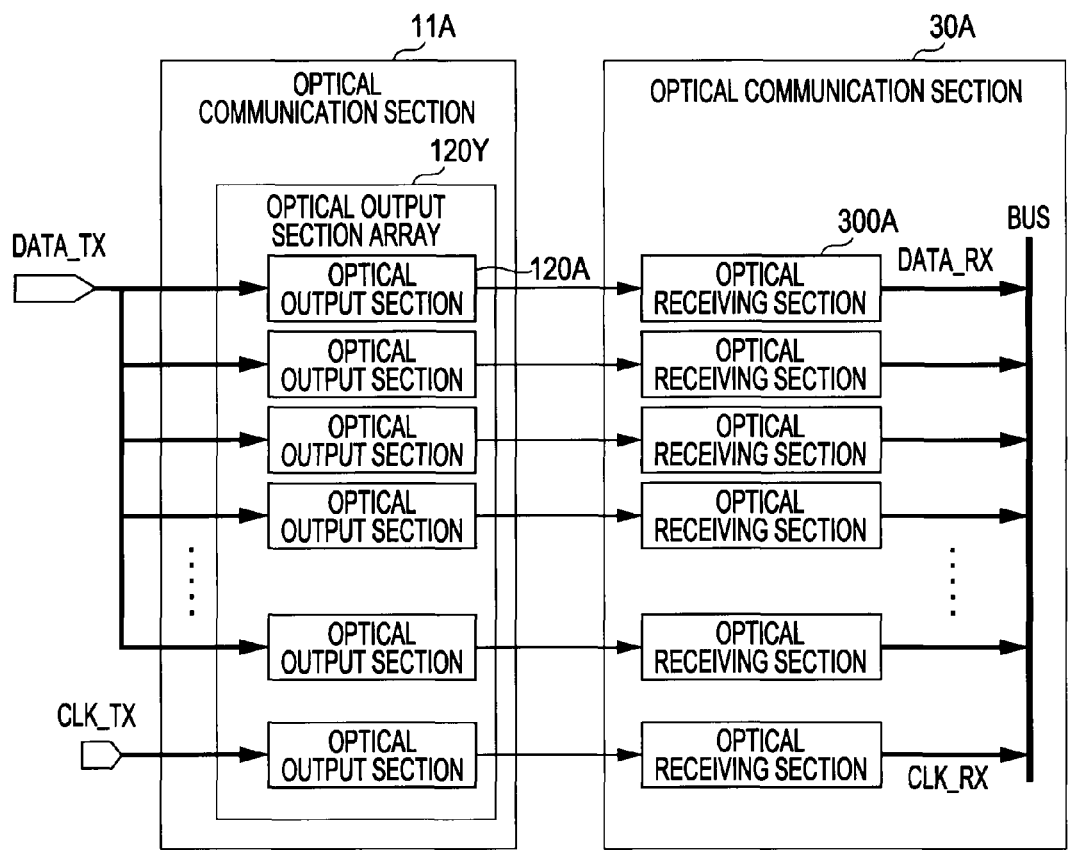
FIG. 36 is a functional block diagram showing an example of an arrayed optical communication section.

FIG. 36 is a functional block diagram showing an example of an arrayed optical communication section. Next, a description will be given of the optimum embodiment of an optical communication section adapted to parallel transmission.

The optical communication section 11A of the solid-state imaging device 1 includes, for example, an optical output section array 120Y in which optical output sections 120A each formed by a self-emission type light-emitting device are arranged in parallel. In the optical output section array 120Y, the optical output sections 120A are arranged in parallel and arrayed in accordance with the number of optical signal lines including data lines to which pixel signals DATA_TX converted into digital signals by the A/D conversion section 12A are outputted, and a clock line to which a clock signal CLK_TX is outputted.

As described above, the solid-state imaging device 1 performs optical communication between the optical communication section 30A of the signal processing apparatus 3A described above with reference to FIG. 35. Thus, in the optical communication section 30A of the signal processing apparatus 3A, optical receiving sections 300A are arranged in parallel and arrayed in accordance with the number of optical signal lines outputted from the solid-state imaging device 1.

In the solid-state imaging device 1, the pixel signals DATA_TX that have undergone A/D conversion by the A/D conversion section 12A, and the clock signal CLK_TX generated by the timing generator 13A, which are described above with reference to FIG. 35 and the like, are inputted to the optical communication section 11A. The pixel signals DATA_TX that have been converted into digital signals, and the clock signal CLK_TX are converted into signal light by the corresponding optical output sections 120A of the optical output section array 120Y and outputted.

The optical signals outputted from the optical communication section 11A of the solid-state imaging device 1 are inputted to the optical communication section 30A of the signal processing apparatus 3A, and are converted into electric signals by the corresponding optical receiving sections 300A. Thus, pixel signals DATA_RX and a clock signal CLK_RX are outputted.

[Example of Serial Transmission by Serialization of Data]

Figure 37:
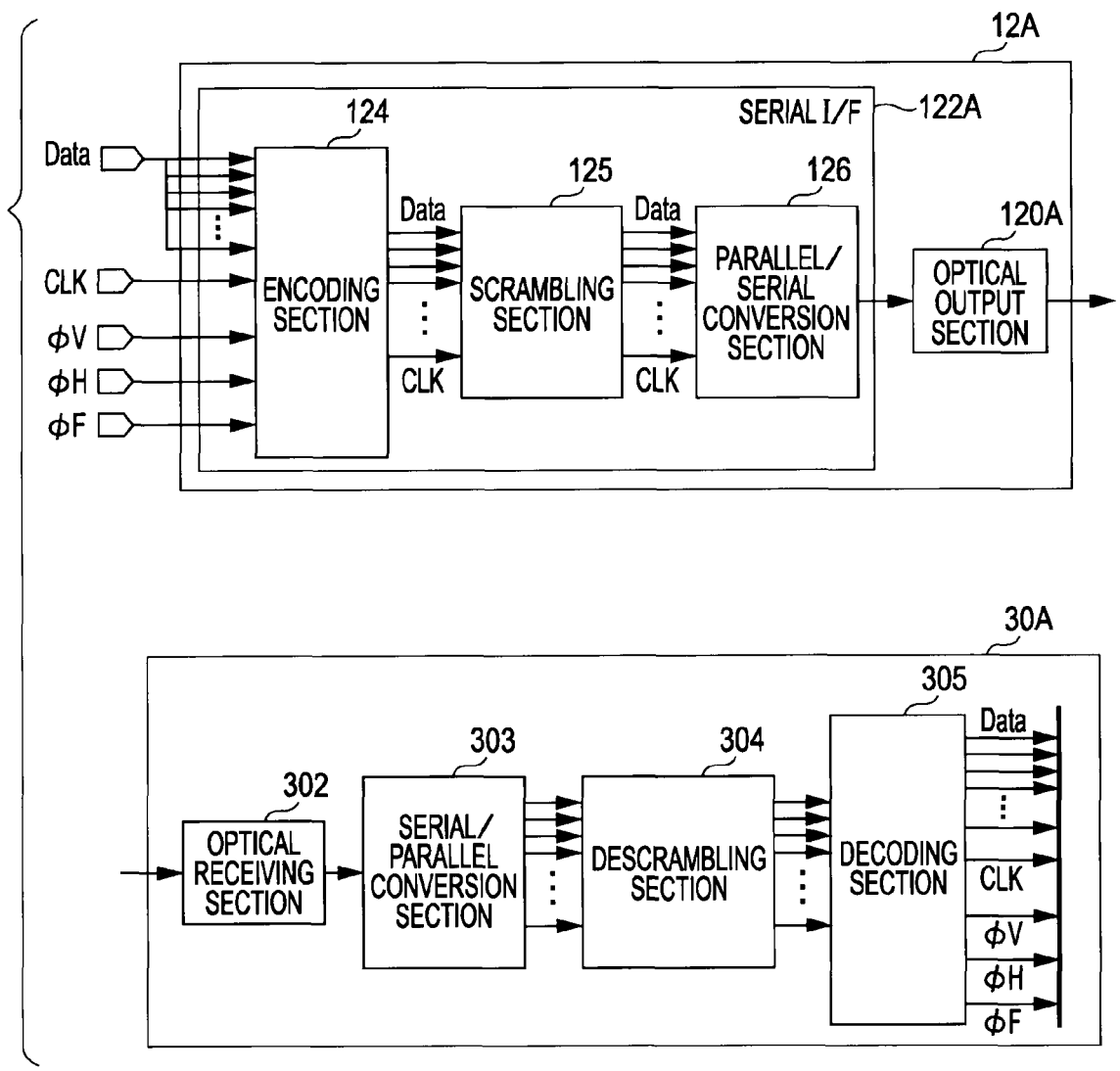
FIG. 37 is a functional block diagram showing an example of an optical communication section that serializes pixel signals for optical communication.

FIG. 37 is a functional block diagram showing an example of an optical communication section that serializes pixel signals for optical communication. Next, a description will be given of the optimum embodiment of an optical communication section adapted to serial transmission.

The optical communication section 11A of the solid-state imaging device 1 includes a serial interface (I/F) 122A that converts pixel signals that have been converted into digital signals in the A/D conversion section 12A described above with reference to FIG. 35 and the like, into serial data.

The serial interface 122A includes an encoding section 124A that superimposes pixel signals DATA that have undergone A/D conversion by the A/D conversion section 12A, and synchronizing signals generated by the timing generator 13A onto each other.

The clock signal CLK generated by the timing generator 13A is inputted to the encoding section 124. In addition, a vertical synchronizing signal φv, which is generated by the timing generator 13A and drives the vertical scanning circuit 102, is inputted to the encoding section 124. Further, a horizontal synchronizing signal φH, which is generated by the timing generator 13A and drives the horizontal scanning circuit 103, and a field signal F for selecting a field are inputted to the encoding section 124. The encoding section 124 adopts, for example, the 8b/10b scheme, and superimposes the clock signal and the synchronizing signals on the data lines for transmission via a single signal line.

The serial interfaces 122A also includes a data scrambling section 125 that scrambles the pixel signals with the synchronizing signals superimposed thereon, and a parallel/serial conversion section 126 that converts the pixel signals on which the synchronizing signals have been superimposed and which have been scrambled. Further, the optical communication section 11A includes the optical output section 120A that converts the serialized pixel data and synchronizing signals into an optical signal and outputs the optical signal.

The optical communication section 30A of the signal processing apparatus 3A includes an optical receiving section 302 into which the serialized pixel and synchronizing signals are inputted as an optical signal, and which converts the inputted optical signal into an electric signal. In addition, the optical communication section 30A includes a serial/parallel conversion section 303 that regenerates a clock from the serialized pixel and synchronizing signals, and detects the pixel signals. Further, the optical communication section 30A includes a descrambling section 304 that descrambles the pixel signals with the synchronizing signal superimposed thereon, and a decoding section 305 that detects the synchronizing signals.

In the solid-state imaging device 1 including the optical communication section 11A that serializes pixel signals for optical communication, a serial signal obtained by superimposing a clock signal and synchronizing signals on data lines is transmitted from the serial interface 122A to the optical output section 120A.

In the serial interface 122A, by generating a digital signal that is serialized by superimposing synchronizing signals and a clock signal on data signals, it is possible to perform signal transmission via a single channel. Thus, it suffices for the optical communication section 11A to have only a single optical output section 120A, which allows the number of optical communication sections 11A to be reduced even with an increase in the number of bits following an increase in the number of pixels.

[Example of Multiple Transmissions by Serialization of Pixel Signals and Provision of Plurality of Optical Input/Output Sections]

Figure 38:
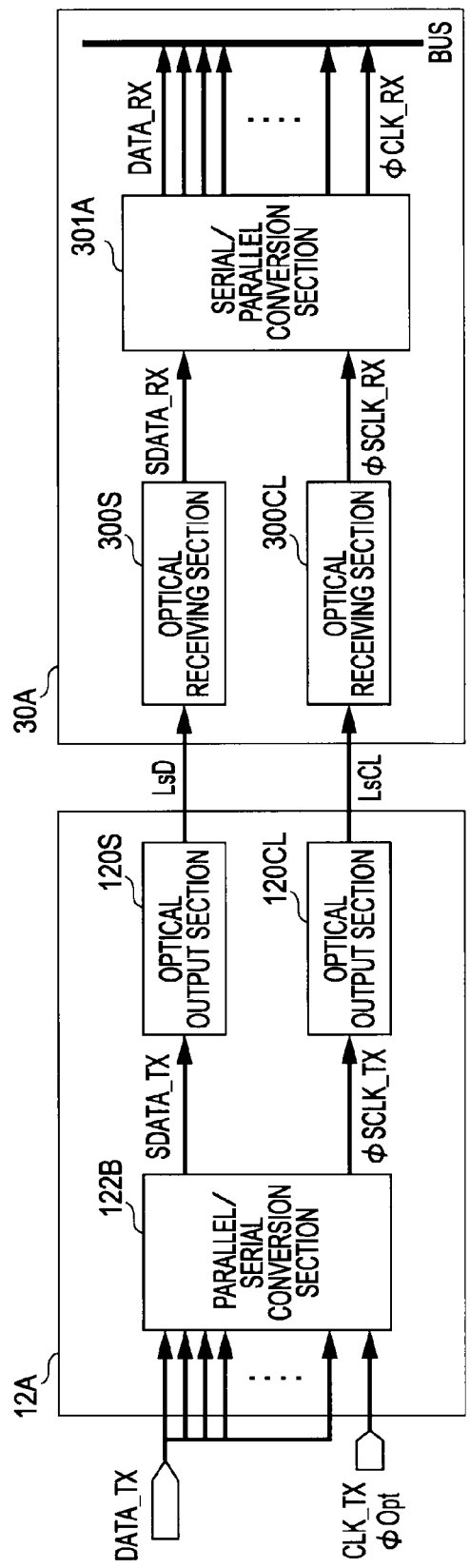
FIG. 38 is a functional block diagram showing an example of an optical communication section that serializes pixel signals for optical communication by a plurality of optical input/output sections.

FIG. 38 is a functional block diagram showing an example of an optical communication section that serializes pixel signals for optical communication by a plurality of optical input/output sections. Next, a description will be given of the optimum embodiment of an optical communication section adapted to serialization of pixel signals for multiple transmissions with a clock signal.

The optical communication section 11A of the solid-state imaging device 1 includes a parallel/serial (P/S) conversion section 122B that converts the pixel signals DATA_TX that have undergone A/D conversion by the A/D conversion section 12A into serial data. The pixel signals DATA_TX that have undergone A/D conversion by the A/D conversion section 12A, and the clock signal CLK_TX generated by the timing generator 13A are inputted to the parallel/serial conversion section 122A.

In addition, the optical communication section 11A includes an optical output section 120S that converts a serialized pixel signal SDATA_TX into an optical signal and outputs the optical signal, and an optical output section 120CL that converts a clock signal ɸCLK_TX into an optical signal and outputs the optical signal.

The optical communication section 30A of the signal processing apparatus 3A includes an optical receiving section 300S into which the pixel signal SDATA_TX that has been serialized and converted into an optical signal is inputted via a data line LsD by optical communication, and which converts the inputted optical signal into a pixel signal SDATA_RX as a serialized electric signal. In addition, the optical communication section 30A includes an optical receiving section 300CL into which the clock signal ɸSCLK_TX that has been converted into an optical signal is inputted via a clock line LsCL by optical communication, and which converts the inputted optical signal into a clock signal ɸSCLK_RX as an electric signal.

Further, the optical communication section 30A includes a serial/parallel conversion section 301A that detects the pixel signals DATA_RX from the pixel signal SDATA_RX that has been converted into an electric signal by the optical receiving section 300S, with the clock signal ɸSCLK_RX that has been converted into an electric signal by the optical receiving section 300CL.

In the solid-state imaging device 1 including the optical communication section 11A that serializes pixel signals and has the data line LsD and the clock line LsCL to perform optical communication, a serial signal and a clock signal are transmitted to the optical output sections 120S and 120CL, respectively, from the parallel/serial conversion section 122B.

The parallel/serial conversion section 122B is simple in terms of circuit configuration and is inexpensive since no superimposition of a clock signal is performed. On the other hand, by serializing data signals, it is possible to perform transmission via two signal lines, namely a data line and a clock line.

Thus, provision of the optical communication section 11A having the two optical output sections 120S and 120CL enables transmission of data signals and a clock signal. Thus, an increase in cost due to an increase in the number of optical communication sections can be kept low.

<9. Example of Effect of Solid-state Imaging Device with Optical Black Area Placed Near Optical Communication Section>

In the solid-state imaging device according to each of the above embodiments, by placing the optical black area between the effective pixel area and the optical communication section, dark current generated in the effective pixel area in accordance with heat generated in the optical communication section can be estimated and subtracted from a signal.

Therefore, even when heat generating in the optical communication section is propagated to the effective pixel area, the optimum dark current level according to the position of a pixel can be removed from a signal, thereby making it possible to prevent degradation of image quality due to black floating or the like over the entire surface of the effective pixel area.

In addition, since degradation of image quality is suppressed by placing the optical communication section near the optical black area, the optical communication section can be placed near the pixel section. This enhances the freedom in the placement of the optical communication section, and also enables miniaturization of the substrate.

Further, with the enhanced freedom in the placement of the optical communication section, the mode of placement of the optical communication section, such as concentrated placement, dispersed placement, and dispersed concentrated placement, can be selected in accordance with the signal transmission mode or the like. In addition, with the enhanced freedom in the placement of the optical communication section, for example, it is possible to adopt various signal transmission schemes, such as parallel transmission, serial transmission by superimposition of synchronizing signals and a clock signal on data lines, and multiple transmissions of serialized data signal and clock signal.

In the solid-state imaging device according to each of the above embodiments, the pixel section 10A and the optical communication section 11A are placed on the front surface side of the substrate 18. However, the optical communication section 11A may be placed on the back surface side of the substrate 18. In the case where the optical communication section 11A is placed on the back side of the substrate 18, incidence of leakage light on the pixel section 10A can be prevented by a simple configuration.

The present application contains subject matter related to that disclosed in Japanese Priority Patent Application JP 2008-264583 filed in the Japan Patent Office on Oct. 10, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel section having an effective pixel area on which light is incident and which converts incident light into an electric signal, and an optical black area that is shielded from light and placed around the effective pixel area, the pixel section being placed on a substrate;
an optical communication section that is placed in proximity to a predetermined optical black area, which is located between the optical communication section and the effective pixel area, of the optical black area placed around the effective pixel area, and converts a signal read from the pixel section into an optical signal and outputs the optical signal, the proximity of the optical communication section to the optical black area corresponds to a positional relation in which heat generated by drive of the optical communication section is propagated to the pixel section, causing dark current in the optical black area to change;
a dark current level supplying section that acquires a dark current level according to the dark current from the optical black area in proximity to which the optical communication section is placed, generates an estimated dark current level that varies with a position of a pixel from which a signal is read, on the basis of the acquired dark current level, and outputs the estimated dark current level in synchronization with a timing of reading a signal from the effective pixel area; and
a noise compensation section to which the estimated dark current level is supplied from the dark current level supplying section, and which subtracts the estimated dark current level from a signal read from the effective pixel area, wherein
the optical black area has a first optical black area and a second optical black area that are formed respectively on one side and the other side across the effective pixel area, and
the dark current level supplying section acquires a first dark current level according to dark current from the first optical black area and acquires a second dark current level according to dark current from the second optical black area, and generates an estimated dark current level that varies on the basis of a difference between the first dark current level acquired from the first optical black area, and the second dark current level acquired from the second optical black area.

2. The solid-state imaging device according to claim 1, wherein:
the optical communication section is placed in proximity to the first optical black area relative to the second optical black area.

3. The solid-state imaging device according to claim 2, wherein:
a single or plurality of the optical communication sections are placed so as to be concentrated in a peripheral portion of the substrate in proximity to the first optical black area.

4. The solid-state imaging device according to claim 2, wherein:
a plurality of the optical communication sections are placed so as to be dispersed in a peripheral portion of the substrate in proximity to the first optical black area.

5. The solid-state imaging device according to claim 2, wherein:
a plurality of the optical communications sections are placed in a concentrated manner so as to be dispersed in a peripheral portion of the substrate in proximity to the first optical black area.

6. The solid-state imaging device according to claim 2, further comprising a light-shielding section that shields input and output of light between the effective pixel area and the optical communication section, and is placed above the first optical black area.

7. The solid-state imaging device according to claim 1, wherein:
the optical communication section is placed in proximity to the predetermined optical black area, without being placed in proximity to another optical black area of the optical black area placed around the effective pixel area.

8. The solid-state imaging device according to claim 2, wherein:
a plurality of the optical communication sections are placed so as to be dispersed in a peripheral portion of the substrate in proximity to the first optical black area, the plurality of the optical communication sections corresponding to a total optical communication section in the solid-state imaging device.

9. The solid-state imaging device according to claim 2, wherein:
a plurality of the optical communications sections are placed on the substrate in proximity to the first optical black area, and at opposite ends along the first optical black area, without other optical communications sections being placed therebetween.

10. A solid-state imaging device comprising:
a pixel section having an effective pixel area on which light is incident and which converts incident light into an electric signal, and an optical black area that is shielded from light and placed around the effective pixel area, the optical black area having a first optical black area and a second optical black area formed respectively on one side and the other side across the effective pixel area; and
an optical communication section that is placed in proximity to the first optical black area relative to the second optical black area, and converts a signal read from the pixel section into an optical signal and outputs the optical signal, the proximity of the optical communication section to the first optical black area corresponds to a positional relation in which heat generated by drive of the optical communication section is propagated to the pixel section, causing dark current in the first optical black area to change, and the first optical black area is located between the optical communication section and the effective pixel area, wherein
a plurality of the optical communications sections are placed on the substrate in proximity to the first optical black area, and at opposite ends along the first optical black area, without other optical communications sections being placed therebetween.

11. A signal processing system comprising:
an optical apparatus having a solid-state imaging device that converts incident light into an electric signal, and an optical device that makes light incident on the solid-state imaging device; and
a signal processing apparatus to which the optical apparatus is connected, wherein the solid-state imaging device includes
a pixel section having an effective pixel area on which light is incident and which converts incident light into an electric signal, and an optical black area that is shielded from light and placed around the effective pixel area,
an optical communication section that is placed in proximity to a predetermined optical black area, which is located between the optical communication section and the effective pixel area, of the optical black area placed around the effective pixel area, and converts a signal read from the pixel section into an optical signal and outputs the optical signal, the proximity of the optical communication section to the optical black area corresponds to a positional relation in which heat generated by drive of the optical communication section is propagated to the pixel section, causing dark current in the optical black area to change,
a dark current level supplying section that acquires a dark current level according to the dark current from the optical black area in proximity to which the optical communication section is placed, generates an estimated dark current level that varies with a position of a pixel from which a signal is read, on the basis of the acquired dark current level, and outputs the estimated dark current level in synchronization with a timing of reading a signal from the effective pixel area, and
a noise compensation section to which the estimated dark current level is supplied from the dark current level supplying section, and subtracts the estimated dark current level from a signal read from the effective pixel area, wherein
the optical black area has a first optical black area and a second optical black area that are formed respectively on one side and the other side across the effective pixel area, and
the dark current level supplying section acquires a first dark current level according to dark current from the first optical black area and acquires a second dark current level according to dark current from the second optical black area, and generates an estimated dark current level that varies on the basis of a difference between the first dark current level acquired from the first optical black area, and the second dark current level acquired from the second optical black area, and wherein the signal processing apparatus includes
an optical communication section to which an optical signal outputted from the optical communication section of the solid-state imaging device is inputted,
a read control section that controls reading of a signal from the pixel section by the solid-state imaging device, and
a signal processing section that performs processing on a signal that is read from the pixel section and inputted by optical communication from the solid-state imaging device.

* * * * *